(12) United States Patent  
Tsuge et al.

(10) Patent No.: US 8,951,065 B2
(45) Date of Patent: Feb. 10, 2015

(54) CONNECTION STRUCTURE OF CONDUCTIVE PATHS

(75) Inventors: Syunya Tsuge, Makinohara (JP); Hajime Kato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 48 days.

(21) Appl. No.: 13/514,779

(22) PCT Filed: Sep. 15, 2011

(86) PCT No.: PCT/JP2011/071144
§ 371 (c)(1),
(2), (4) Date: Jun. 8, 2012

(87) PCT Pub. No.: WO2012/043263
PCT Pub. Date: Apr. 5, 2012

(65) Prior Publication Data
US 2012/0244746 A1    Sep. 27, 2012

(30) Foreign Application Priority Data
Sep. 30, 2010   (JP) ................................. 2010-220502

(51) Int. Cl.
    H01R 13/73    (2006.01)
(52) U.S. Cl.
    USPC ................... 439/559; 439/565; 439/607.01
(58) Field of Classification Search
    USPC ............................ 439/559, 556, 564, 565, 694
    See application file for complete search history.

(56) References Cited

U.S. PATENT DOCUMENTS

| 4,592,611 | A | * | 6/1986 | Nitschke | 439/345 |
| 4,861,282 | A | * | 8/1989 | Kobayashi et al. | 439/540.1 |
| 5,104,333 | A | * | 4/1992 | Hatagishi et al. | 439/342 |
| 5,139,431 | A | * | 8/1992 | Saitoh et al. | 439/364 |
| 7,264,506 | B2 | * | 9/2007 | Mori et al. | 439/606 |
| 7,520,764 | B2 | | 4/2009 | Lee et al. | |
| 7,588,449 | B2 | | 9/2009 | Takehara | |
| 7,614,910 | B2 | * | 11/2009 | Croteau et al. | 439/573 |
| 8,525,476 | B2 | | 9/2013 | Ichikawa | |
| 2007/0218747 | A1 | | 9/2007 | Takehara | |
| 2011/0193521 | A1 | | 8/2011 | Ichikawa | |

FOREIGN PATENT DOCUMENTS

| CN | 101038995 A | 9/2007 |
| CN | 101286595 A | 10/2008 |
| CN | 102177045 A | 9/2011 |

(Continued)

OTHER PUBLICATIONS

International Search Report (PCT/ISA/210) issued on Oct. 11, 2011 in the International Patent Application No. PCT/JP2011/071144.
Written Opinion (PCT/ISA/237) issued on Oct. 11, 2011 in the International Patent Application No. PCT/JP2011/071144.
Office Action, dated Mar. 26, 2014, issued by the State Intellectual Property Office of PR China in counterpart Chinese Patent Application No. 201180005246.2.

(Continued)

*Primary Examiner* — Hien Vu
(74) *Attorney, Agent, or Firm* — Sughrue Mion, PLLC

(57) ABSTRACT

A first conductive path and a battery are connected via a junction block that is provided to the battery. The junction block is provided with a second conductive path. The second conductive path is arranged at an upper side of a floor which is to be an interior side of a panel member. The first conductive path and the second conductive path are electrically connected in the vicinity of a through-hole of the panel member. A part of the first conductive path is inserted into the through-hole and then the first conductive path is connected to the second conductive path.

1 Claim, 27 Drawing Sheets

(56) References Cited

FOREIGN PATENT DOCUMENTS

| JP | 6182688 A | 4/1986 |
| JP | 2007290616 A | 11/2007 |
| JP | 2008103325 A | 5/2008 |

OTHER PUBLICATIONS

Office Action dated Aug. 19, 2014, issued by the Japanese Patent Office in counterpart Japanese Application No. 2010-220502.

* cited by examiner

FIG.19
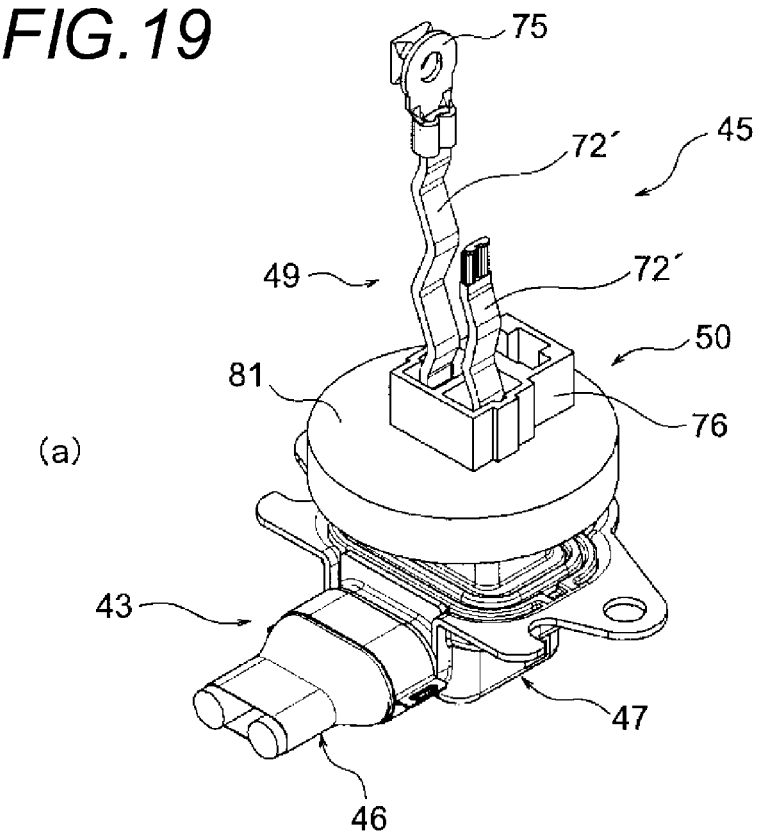
(a)
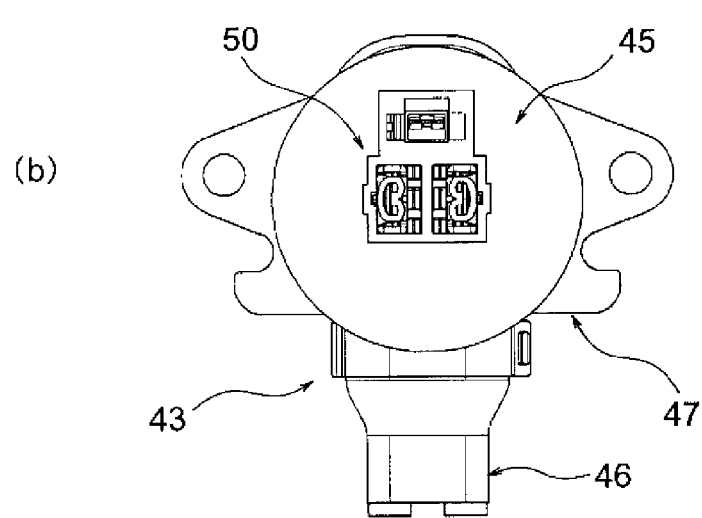
(b)

CONNECTION STRUCTURE OF CONDUCTIVE PATHS

TECHNICAL FIELD

The present invention relates to a connection structure of conductive paths including a first conductive path, a second conductive path and a panel member interposed between the paths and making electrical connection.

BACKGROUND ART

Patent Literature 1 discloses an arranging structure of a wire harness that is adopted in a hybrid automobile or electric automobile. A connection structure of the wire harness is also disclosed. In the below, the structures are described with reference to FIG. 29.

In FIG. 29, a hybrid automobile 1 has an automobile interior 6 having a driver seat 3, a front passenger seat 4 and a rear seat 5 at a rear side of an engine room 2. The engine room 2 is provided with an engine 7, a motor 8 and an inverter 9. The motor 8 and the inverter 9 are connected by a motor cable 10. The inverter 9 is connected with an end of a wire harness 11. The other end of the wire harness 11 is connected to a battery 12 (a battery pack) that is provided between the driver seat 3 and the front passenger seat 4 of the automobile interior 6.

The wire harness 11 includes two high voltage electric cables 13. Ends of the respective high voltage electric cables 13 are provided with terminals 14. The terminals 14 are engaged and fixed to a terminal block 15, which is provided to a rear side of the battery 12 (or junction block interposed between the battery 12 and the terminals), by bolts 16. The wire harness 11 is arranged at a lower side of a floor, which is to be a ground surface side of a floor panel 17. Also, the wire harness is retracted into the automobile interior 6 via a through-hole 18 of the floor panel 17. The through-hole 18 is arranged at the rear of the battery 12. The wire harness 11 retracted into the automobile interior 6 is arranged with being bent toward the front.

CITATION LIST

Patent Literature

Patent Literature 1: JP-A-2007-290616

SUMMARY OF INVENTION

Technical Problem

According to the above technology, when arranging the wire harness 11, it is necessary to insert the other end thereof into the through-hole 18 of the floor panel 17 and to perform an electrical connection operation after retracting the wire harness 11 into the automobile interior 6. Thereby, an operation sequence and management become cumbersome. Also, it is necessary to incorporate a grommet (not shown) during the operation and to thus secure waterproof performance. Hence, also in this case, the operation sequence and management become cumbersome.

The present invention has been made to solve the above problem.

An object of the invention is to provide a connection structure of conductive paths with which it is possible to simplify an operation sequence by omitting a connection operation associate with a retraction and also to simplify an operation management.

Solution to Problem

The above object of the invention is realized by following configurations.

(1) A connection structure of conductive paths, including: a first conductive path that is arranged at a first surface side of a panel member, and a second conductive path that is arranged at a second surface side of the panel member, wherein a connection leading end portion of a first connection part of the first conductive path is inserted into a through-hole of the panel member and the connection leading end portion and a second connection part of the second conductive path are connected in the vicinity of the through-hole.

According to the connection structure of conductive paths having the above configuration (1), when electrically connecting the first connection part of the first conductive path that is arranged at the first surface side of the panel member and the second connection part of the second conductive path that is arranged at the second surface side of the panel member, the connection is made at a position adjacent to the through-hole of the panel member. Specifically, the connection leading end portion of the first connection part of the first conductive path is inserted into the through-hole and the connection leading end portion and the second connection part of the second conductive path are connected by the insertion.

Accordingly, it is possible to omit the connection operation accompanying the retraction, like the related art. Thereby, it is possible to simplify the operation sequence and also the operation management.

The connection structure of conductive paths according to the above configuration (1), further including a second terminal moving mechanism that moves a second terminal of the second connection part in conformity to a position of a first terminal of the connection leading end portion when making the connection.

According to the connection structure of conductive paths having the above configuration (2), even when the respective terminal positions of the first connection part and the second connection part are deviated, the second terminal of the second connection part is moved by the second terminal moving mechanism when making the connection and the deviation is thus absorbed. In the meantime, the above configuration (2) is useful in that a large-sized mechanism (for example, known self-alignment connector mechanism) for moving the whole first connection part or second connection part and thus absorbing the deviation is not necessary.

Accordingly, it is possible to absorb the positional deviation between the respective terminals of the first connection part and the second connection part. Thereby, the operation can be smoothly made.

(3) The connection structure of conductive paths according to the configuration (1) or (2), wherein a main body part of the first connection part is provided with a seal member to cover the through-hole water-tightly with the main body part.

According to the connection structure of conductive paths having the above configuration (3), the through-hole of the panel member is covered with the main body part of the first connection part, so that the waterproof is made.

Accordingly, it is possible to secure the waterproof performance. Also, according to the invention, since the waterproof is made without using a grommet, it is possible to simplify the operation sequence.

(4) The connection structure of conductive paths according to any one of the above configurations (1) to (3), wherein the second conductive path including the second connection part is formed as a constitutional member of a device that is provided at the second surface side, and the first conductive path is thus directly connected to the device.

According to the connection structure of conductive paths having the above configuration (4), it is possible to directly connect the first connection part to the device arranged at the opposite side of the panel member while inserting the connection leading end portion of the first connection part into the through-hole.

Accordingly, it is possible to provide the appropriate connection structure when making the direct connection with the device arranged at the opposite side of the panel member.

BRIEF DESCRIPTION OF DRAWINGS

In FIG. 4, FIGS. 4(a) and 4(b) show a connector connection part, in which FIG. 4(a) is a perspective view and FIG. 4(b) is a plan view.

FIGS. 19(a) and 19(b) show a connector connection part showing a connection structure of conductive paths according to an embodiment of the invention, in which FIG. 19(a) is a perspective view and FIG. 19(b) is a plan view (second embodiment).

FIGS. 21(a) and 21(b) shows an arrangement of a first conductive path, in which FIG. 21(a) is a perspective view seen from an upper side of a floor and FIG. 21(b) is a perspective view seen from a lower side of the floor.

MODES FOR CARRYING OUT INVENTION

The present invention relates to a connection structure of conductive paths of electrically connecting, in the vicinity of a through-hole of a panel member, a first connection part of a first conductive path that is arranged at a first surface side of the panel member and a second connection part of a second conductive path that is arranged at a second surface side of the panel member.

Figure 1:
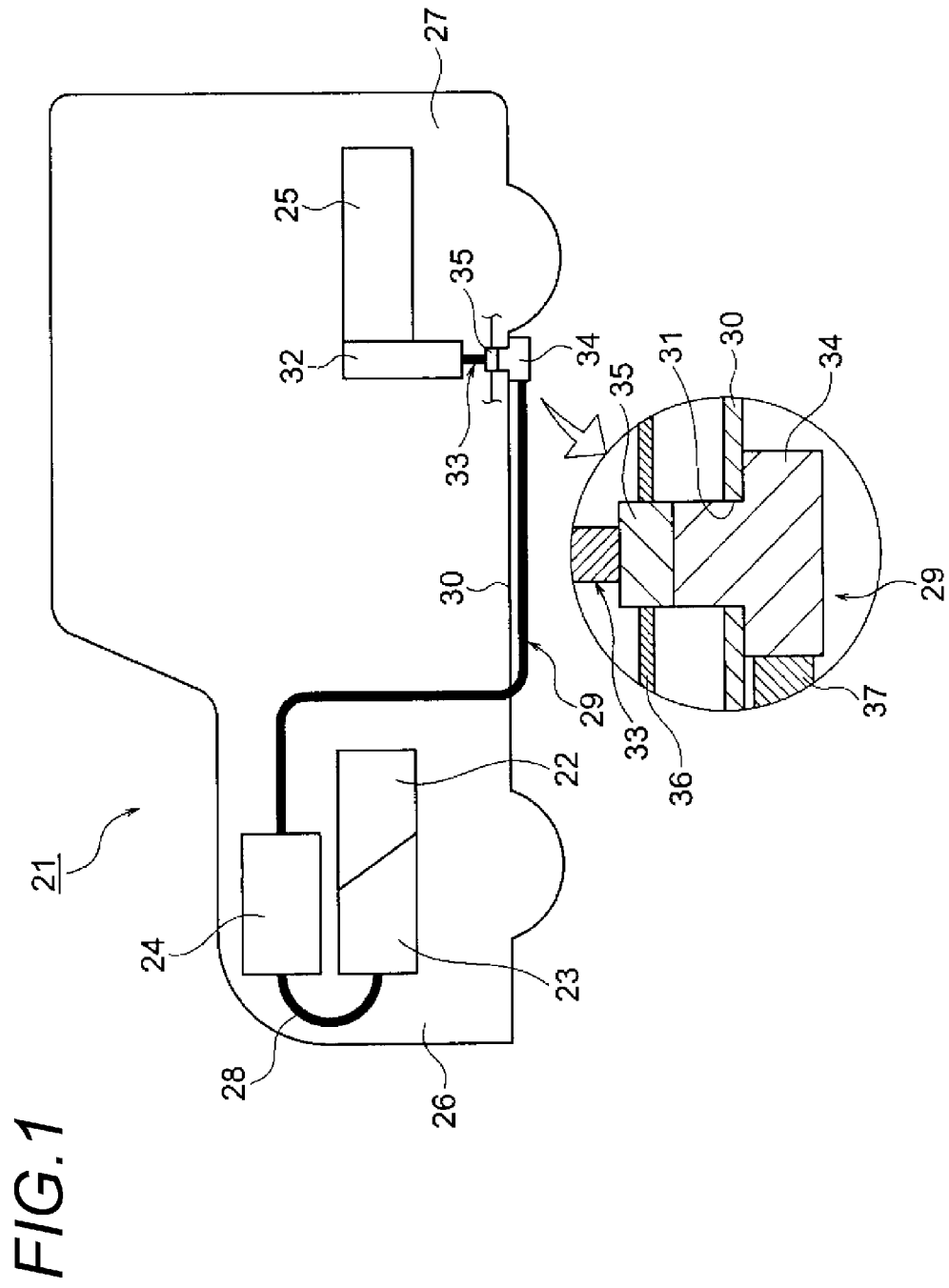
FIG. 1 is a schematic view of a hybrid automobile adopting a connection structure of conductive paths according to an embodiment of the invention.

In the below, an example where the invention is applied to a hybrid automobile (alternatively, electric automobile) is described. FIG. 1 is a schematic view of a hybrid automobile adopting a connection structure of conductive paths according to an embodiment of the invention.

In FIG. 1, a hybrid automobile 21 is a vehicle that mixes two powers of an engine 22 and a motor unit 23 and thus drives. The power is fed from a battery 25 (a battery pack) to the motor unit 23 through an inverter unit 24. In this embodiment, the engine 22, the motor unit 23 and the inverter unit 24 are mounted on an engine room 26 of a position at which front wheels and the like are arranged. Also, the battery 25 is mounted on an automobile rear side 27 at which rear wheels are arranged (the battery 25 may be mounted in an automobile interior at a rear side of the engine room 26).

The motor unit 23 and the inverter unit 24 are connected by a known high voltage wire harness 28. Also, the battery 25 and the inverter unit 24 are connected by a first conductive path 29 of this embodiment. The first conductive path 29 has a high voltage wire harness. The first conductive path 29 is arranged at a lower side of a floor, which is to be a ground surface side of a panel member 30 of this embodiment. The panel member 30 is a known body, but has a through-hole 31 that is formed at a predetermined position.

The first conductive path 29 and the battery 25 are connected through a junction block 32 that is provided to the battery 25. The junction block 32 is provided with a second conductive path 33 of this embodiment. The second conductive path 33 is arranged at an upper side of the floor, which is to be an interior side of the panel member 30. The first conductive path 29 and the second conductive path 33 are electrically connected in the vicinity of the through-hole 31 of the panel member 30. A part of the first conductive path 29 is inserted into the through-hole 31 and then the first conductive path 29 is connected to the second conductive path 33.

Reference numerals 34, 35 indicate a first connection part and a second connection part which are to be connection parts of the first conductive path 29 and the second conductive path 33. When connecting the first conductive path 29 and the second conductive path 33, the second connection part 35 of the second conductive path 33 has a mechanism capable of absorbing a positional deviation of a terminal (which will be specifically described in the below). The second connection part 35 has a housing that is fixed to an inner panel 36. The first connection part 34 of the first conductive path 29 is fixed to the lower side of the floor of the panel member 30 and can water-tightly cover the through-hole 31 by the fixation.

The first conductive path 29 is arranged with a first conductive path main body 37 not being retracted into the upper side of the floor of the panel member 30. Therefore, compared to the related art, it is possible to make the connection in a simpler operation sequence. As the operation sequence is simplified, the operation management is also simplified.

Additionally describing this embodiment, the motor unit 23 includes a motor and a generator. Also, the inverter unit 24 includes an inverter and a converter. The motor unit 23 is configured as a motor assembly including a shield casing. The inverter unit 24 is also configured as an inverter assembly including a shield casing. The battery 25 is a Ni—MH based battery or Li-ion based battery and is modularized. In the meantime, an electric storage device such as capacitor may be also used. The battery 25 is not particularly limited insomuch as it can be used in the hybrid automobile 21 or electric automobile.

FIRST EMBODIMENT

Figure 2:
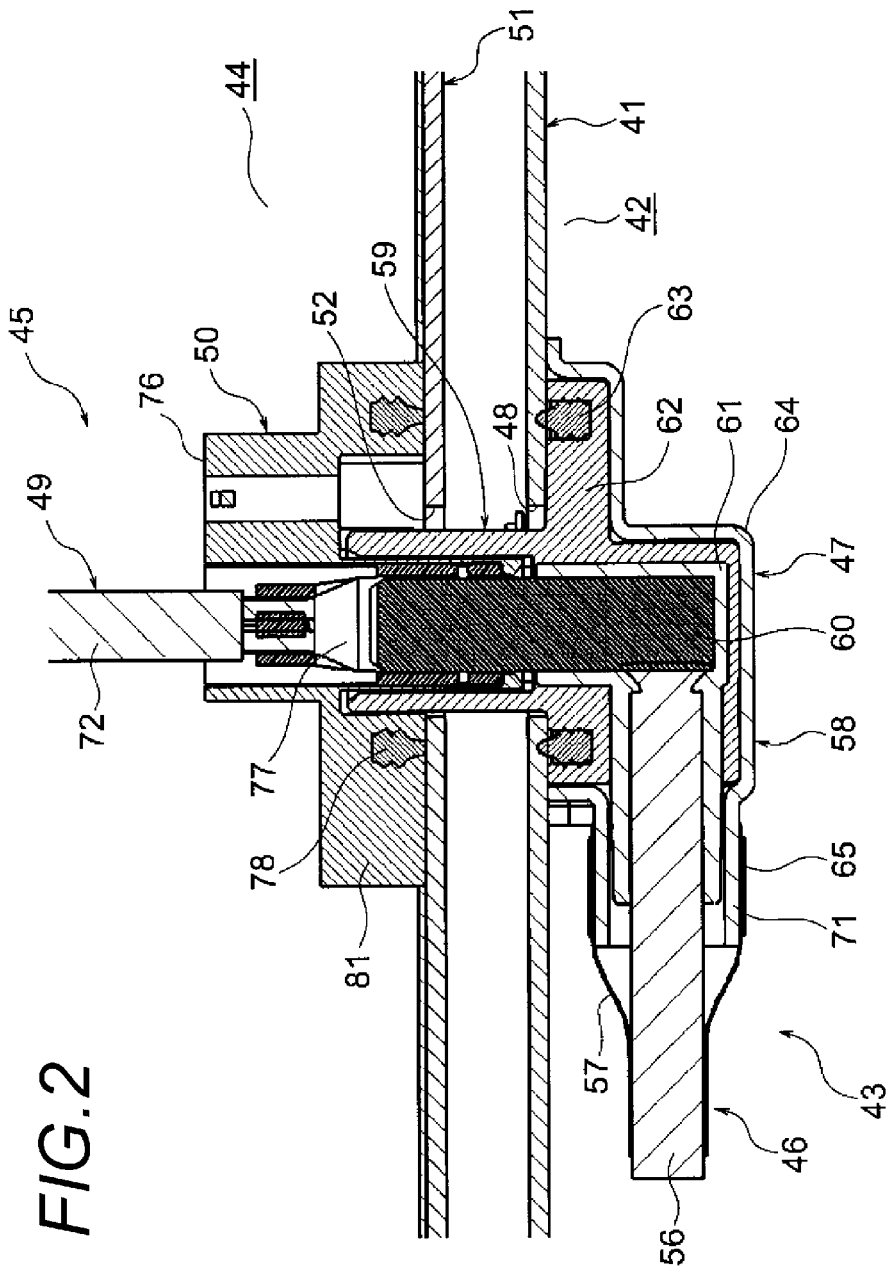
FIG. 2 is a sectional view showing the connection structure of conductive paths according to an embodiment of the invention (first embodiment).
Figure 3:
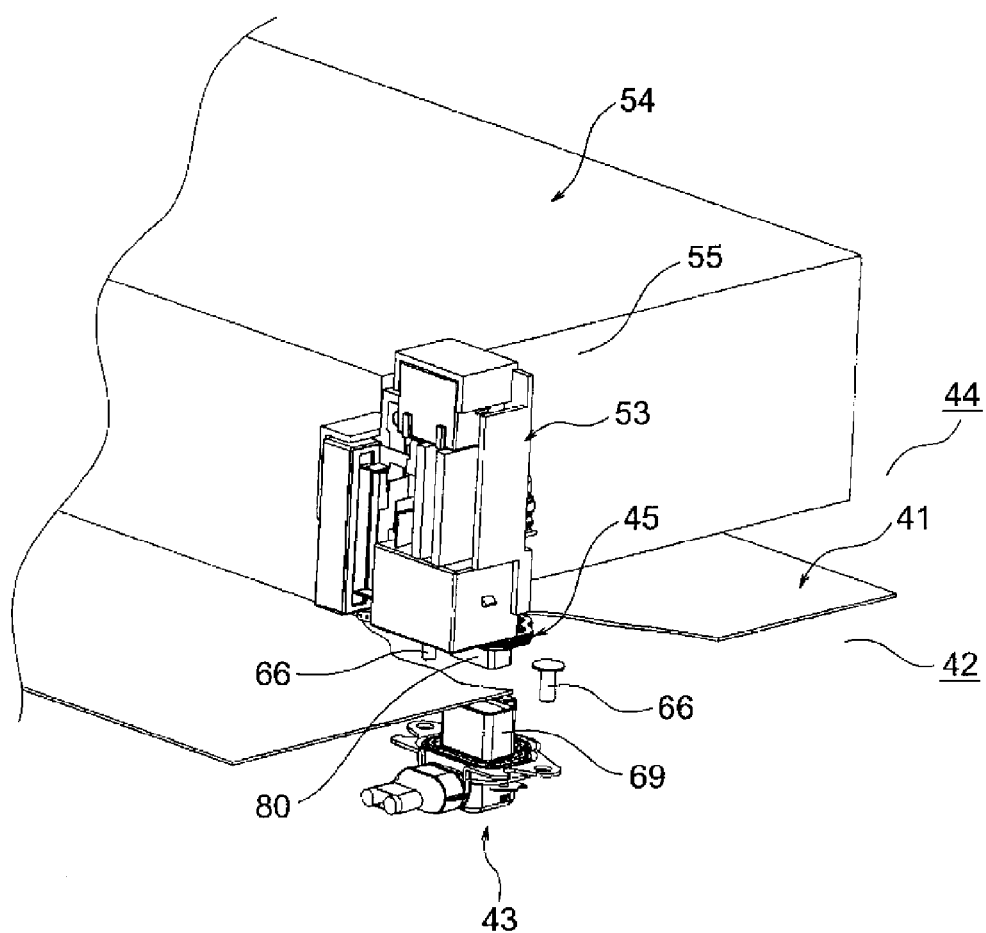
FIG. 3 is a perspective view of a part adopting the connection structure of conductive paths.
Figure 4:
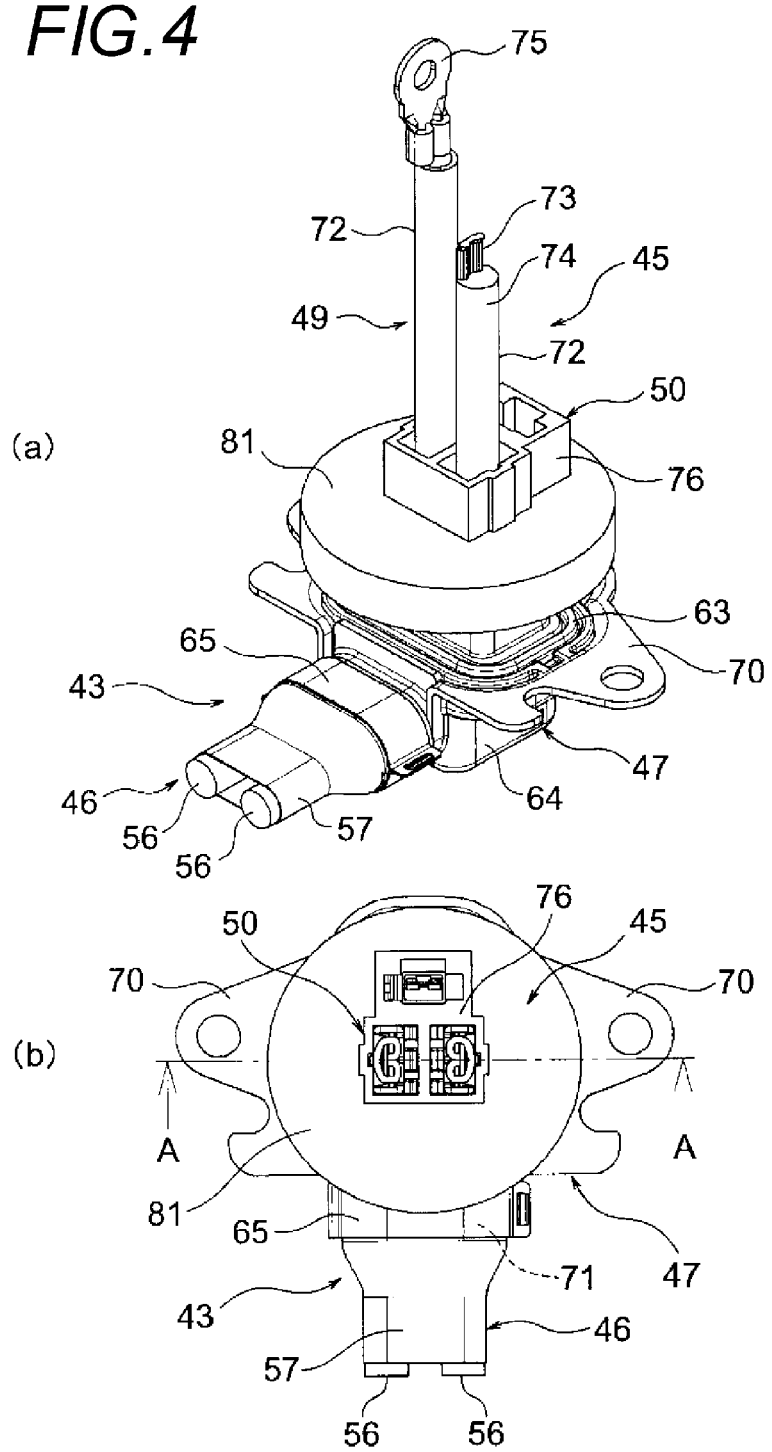
Figure 5:
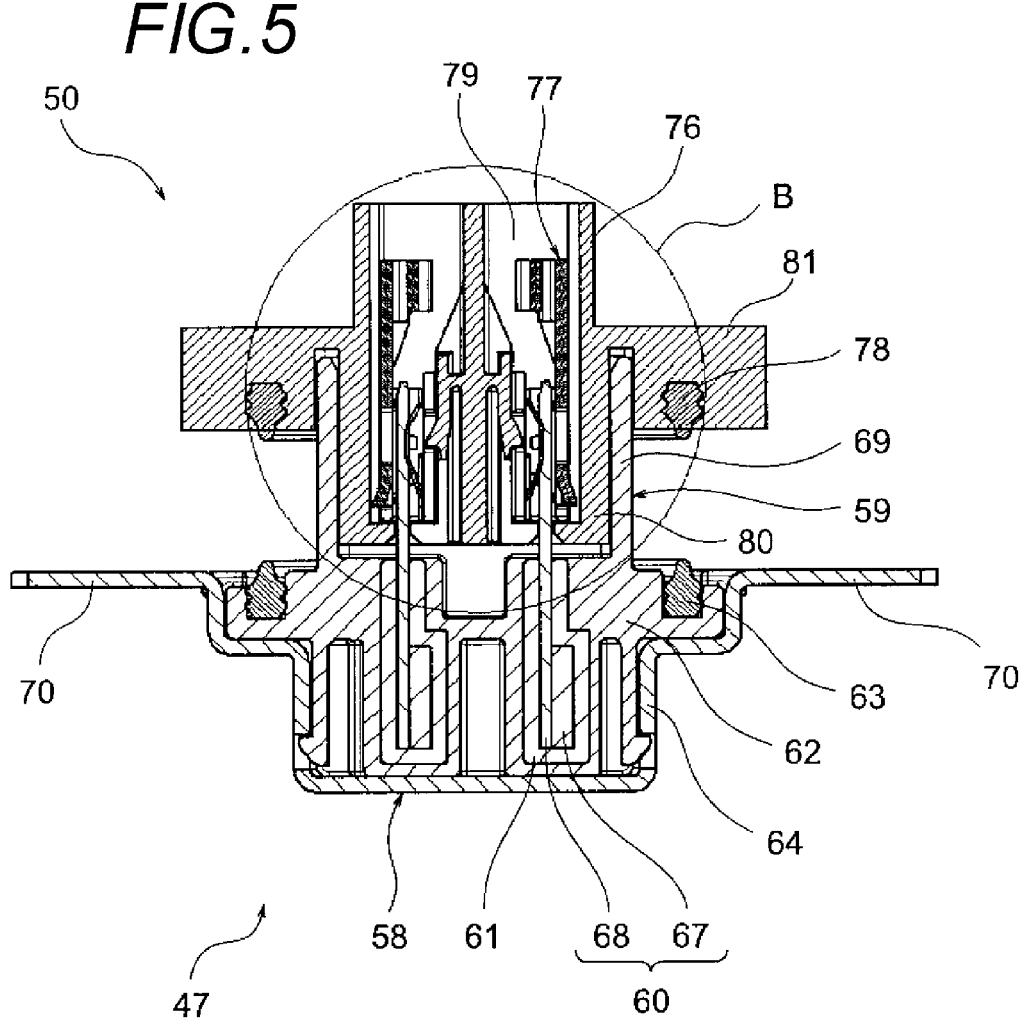
FIG. 5 is a sectional view taken along a line A-A of FIG. 4(b).
Figure 6:
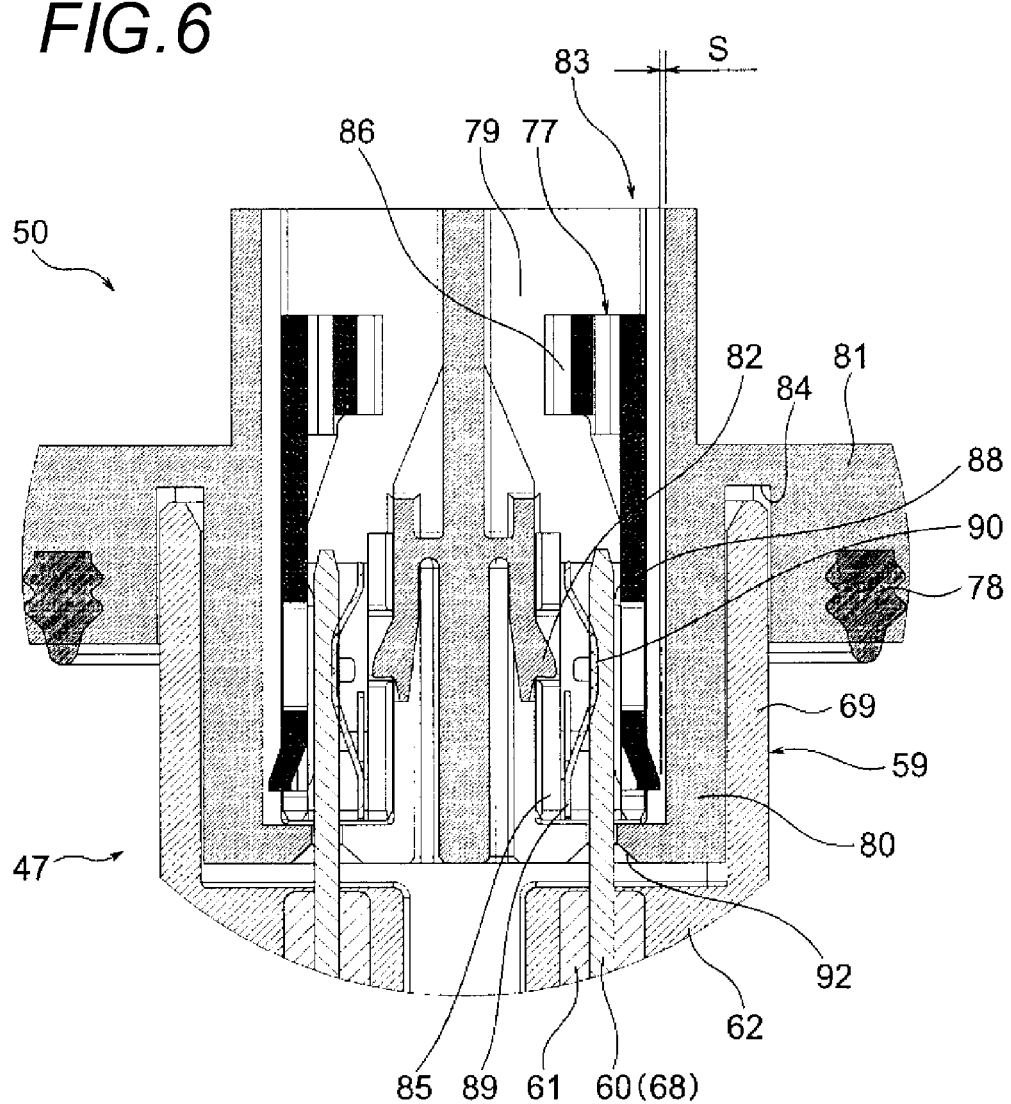
FIG. 6 is an enlarged view of a circle B of FIG. 5.
Figure 7:
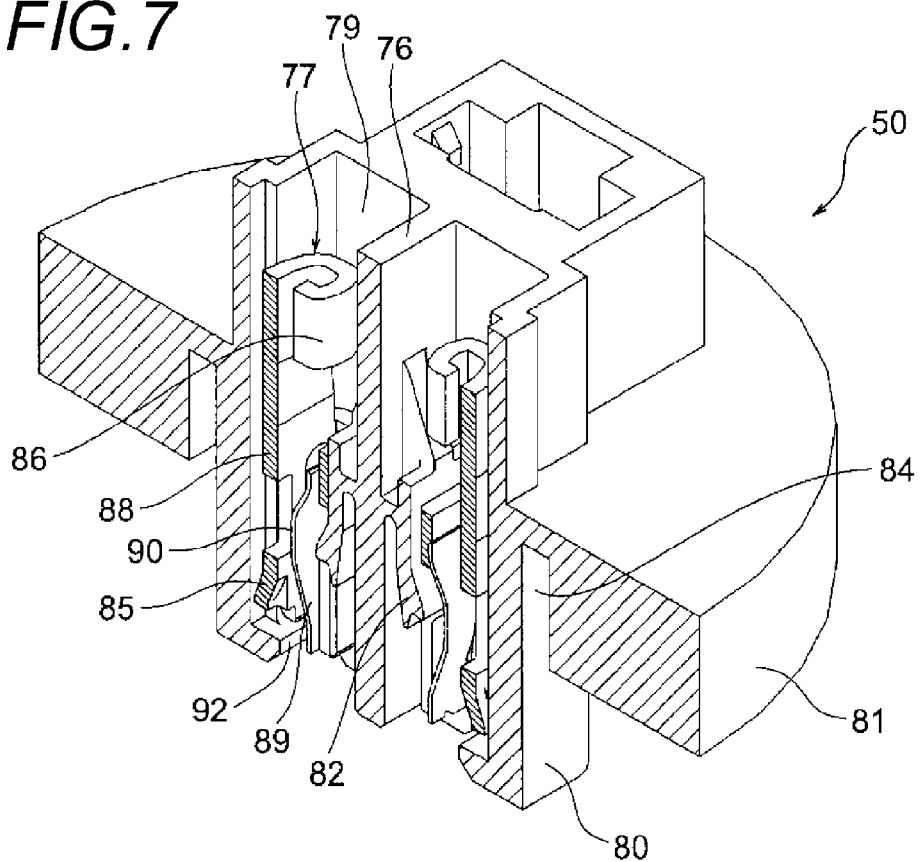
FIG. 7 is a perspective view (including a sectional view) of a second connection part.
Figure 8:
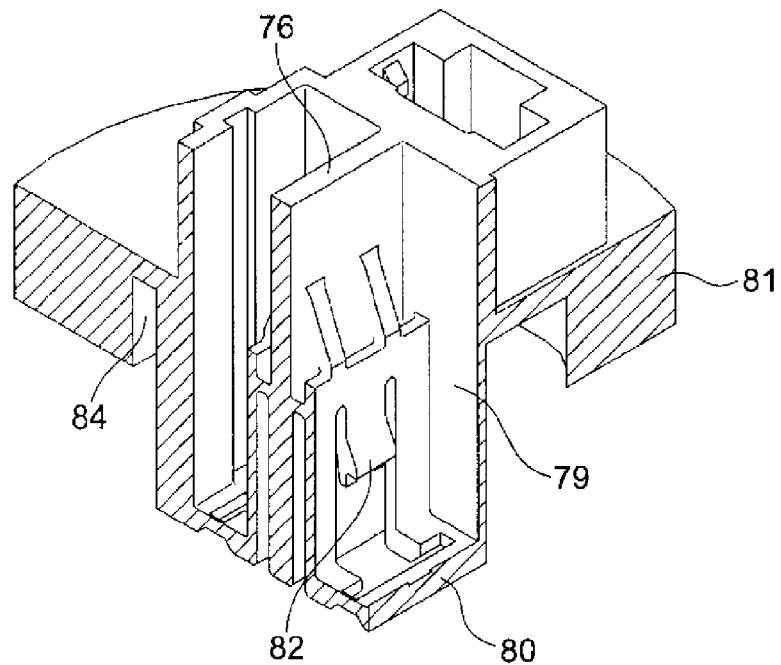
FIG. 8 is a perspective view (including a sectional view) of a second connector housing.
Figure 9:
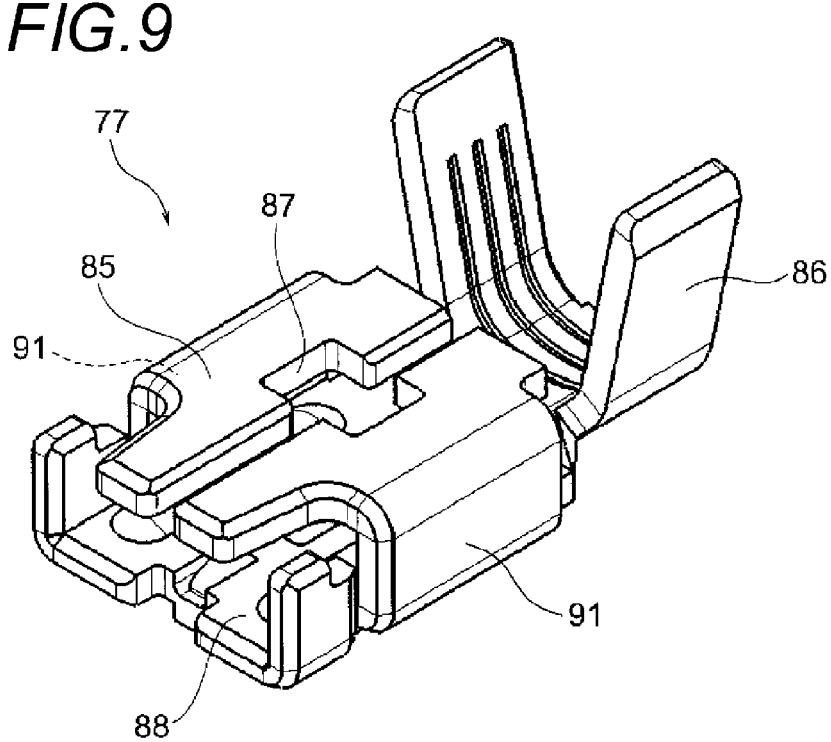
FIG. 9 is a perspective view of a second terminal.

In the below, a first embodiment is described with reference to FIGS. 2 to 18. FIG. 2 is a sectional view showing a connection structure of conductive paths according to an embodiment of the invention. FIG. 3 is a perspective view of a part adopting the connection structure of conductive paths, FIGS. 4(a) and 4(b) show a connector connection part, FIG. 5 is a sectional view taken along a line A-A of FIG. 4(b), FIG. 6 is an enlarged view of a circle B of FIG. 5, FIG. 7 is a perspective view (including a sectional view) of a second connection part, FIG. 8 is a perspective view (including a sectional view) of a second connector housing, FIG. 9 is a perspective view of a second terminal and FIGS. 10 to 18 illustrates operations of a second terminal moving mechanism.

In the first embodiment, like the above description, the invention is applied to a hybrid automobile (alternatively, electric automobile).

In FIG. 2, a first conductive path 43 is arranged at a lower side 42 (first surface side) of a floor of a panel member 41 serving as a body. Also, a second conductive path 45 is arranged at an upper side 44 (second surface side) of the floor of the panel member 41. The panel member 41 has conductivity and rigidness enabling body earth.

The first conductive path 43 is arranged in substantially parallel with the panel member 41. That is, the first conductive path 43 is arranged at a distance from a ground. The first conductive path 43 has a structure having a low height so that it is arranged at a distance from the ground. The first conductive path 43 has a first conductive path main body 46, a first connection part 47 that is provided at one end of the first conductive path main body 46 and a connection part (not shown) for an inverter unit that is provided at the other end of the first conductive path main body 46. The first conductive path 43 includes a high voltage wire harness. The first conductive path 43 is configured so that a direction substantially orthogonal to the arranging direction (arranging direction along the panel member 41) is to be a connection direction with the second conductive path 45. The first conductive path 43 is configured so that it is connected to the second conductive path 45 after a part of the first connection path 47 is inserted into a through-hole 48 of the panel member 41.

The second conductive path 45 is arranged so that the entirety thereof exists in a direction substantially orthogonal to the panel member 41 (the arranging direction is exemplary). The second conductive path 45 has a second conductive path main body 49 and a second connection part 50 that is provided at one end of the second conductive path main body 49. The second connection part 50 has a second connector housing 76 (which will be described below) that is fixed to an inner panel 51 provided at a predetermined interval inside the panel member 41. The inner panel 51 is formed with a through-hole 52 for connector connection.

The second conductive path 45 is provided as one constitutional member of a junction block 53 (device) shown in FIG. 3. In FIG. 3, the junction block 53 is provided on one sidewall 55 of a battery 54 (device). The junction block 53 and the battery 54 are devices that are arranged at an opposite side to the panel member 41 and the inner panel 51, when seen from the first conductive path 43. The first conductive path 43 is configured so that it can be directly connected to the devices.

In the below, the respective configurations of the fist conductive path 43 and the second conductive path 45 are more specifically described.

In FIGS. 2 and 4, the first conductive path main body 46 of the first conductive path 43 has two high voltage electric cables 56 and an electromagnetic shield member 57 that collectively shields the two high voltage electric cables 56. The high voltage electric cable 56 is a conductive path including a conductor and an insulator (cover) and is formed to have a length that is necessary for electrical connection. The conductor is made of copper, copper alloy or aluminum. The conductor may have any of a conductor structure consisting of wires twisted each other and a conductor structure of a rod shape having a rectangular or circular section (for example, a conductor structure consisting of a single core of a straight angle or round single core. In this case, the electric cable itself also has a rod shape). The high voltage electric cable 56 has a non-shielded electric cable configuration.

Meanwhile, in this embodiment, the high voltage electric cable 56 is adopted. However, the invention is not limited thereto. That is, a configuration where an insulator is provided to a known bus bar may be also used.

The electromagnetic shield member 57 is a member for electromagnetic shielding (a member for measures against electromagnetic wave) that covers the two high voltage electric cables 56) and is formed into a cylindrical shape by a braid having a plurality of extremely thin conductive wires. The electromagnetic shield member 57 has a length that is the substantially same as the entire length of the two high voltage electric cables 56.

In this embodiment, the electromagnetic shield member 57 is formed of the braid. However, the invention is not limited thereto. That is, a shield member made of a metal foil, a single body of a metal foil and the like may be also used inasmuch as it can take measures for electromagnetic waves.

The first connection part 47 consists of a plurality of constitutional members and has a substantial L section. In the first connection part 47 having such a shape, a part parallel with the panel member 41 can be referred to as a connection base end portion 58 (main body part) and a part orthogonal thereto can be referred to as a connection leading end portion 59. The connection base end portion 58 is formed as a functional part that fixes one end portion of the first conductive path main body 46. Also, the connection leading end portion 59 is formed as a functional part that makes the electrical connection with the second conductive path 45.

In FIGS. 2 to 5, the first connection part 47 has first terminals 60, first terminal holders 61, a first connector housing 62, a packing 63 (seal member), a shield shell 64, a shield member holding ring 65, fixing bolts 66 and nuts. The first connection part 47 is formed such a shape that the first terminal 60 and the first connector housing 62 extend over the connection base end portion 58 and the connection leading end portion 59.

The first terminal 60 is a conductive metal member and has a base end-side first terminal 67 that is connected to the conductor of the high voltage electric cable 56 and a leading end-side first terminal 68 that is connected to the base end-side first terminal 67 and extends in the orthogonal direction (refer to FIG. 5). The leading end-side first terminal 68 has a tap shape. In this embodiment, the base end-side first terminal 67 and the leading end-side first terminal 68 are separately configured. However, the invention is not limited thereto. That is, they may be integrally configured. The connected state of the base end-side first terminal 67 and the leading end-side first terminal 68 is held by the first terminal holder 61.

The first connector housing 62 is an insulating resin member, has terminal accommodation parts (a reference numeral thereof is omitted), a connector fitting part 69 and a packing groove (a reference numeral thereof is omitted) and is formed as shown. In the terminal accommodation part, the first terminal 60 whose connected state is held by the first terminal holder 61 is accommodated. The connector fitting part 69 is a cylindrical part that is inserted into the through-hole 48 of the panel member 41, and the leading end-side first terminal 68 of the first terminal 60 protrudes (is exposed) into the connector fitting part. The packing groove is formed to surround the through-hole 48 of the panel member 41. That is, the packing groove has an annular groove shape. In the packing groove, the packing 63 made of elastomer is incorporated. The packing 63 is closely contacted to a peripheral part of the through-hole 48 of the panel member 41, thereby forming a waterproof structure.

The shield shell 64 is a conductive metal member and has a substantial cover shape that covers the first connector housing 62. The shield shell 64 is formed with a panel member fixing parts 70 and a shield member connection part 71. The panel member fixing part 70 has a flange shape having a bolt insertion through-hole (a reference numeral thereof is omitted). In the bolt insertion through-hole, the fixing bolt 66 (refer to FIG. 3) for fixing the panel member fixing part 70 to the panel member 41 is inserted. The shield member connection part 71 is formed so that one end of the electromagnetic shield member 57 can be inserted to an outer side thereof. Also, the shield member connection part is formed so that it can be fixed by the shield member holding ring 65. The electromagnetic shield member 57 is body-earthed to the panel member 41 via the shield shell 64.

In FIGS. 2, 4(a) and 4(b), the second conductive path main body 49 of the second conductive path 45 has two high voltage electric cables 72. The high voltage electric cable 72 is a conductive path including a conductor 73 and an insulator 74 (cover) and is formed to have a length that is necessary for electrical connection. In this embodiment, the conductor 73 has a conductor structure having wires twisted each other (this is exemplary. Regarding the other example, refer to a second embodiment). One end of each of the two high voltage electric cables 72 is provided with a terminal 75 that is connected to a circuit (not shown) of the junction block 53. The two high voltage electric cables 72 have flexibility.

In FIGS. 2, 4(a), 4(b) and 5, the second connection part 50 has a second connector housing 76, second terminals 77 and a packing 78. The second connector housing 76 is an insulating resin member, has terminal accommodation parts 79, a connector fitting part 80, a base 81 for fixing and a packing groove (a reference numeral thereof is omitted) and is formed as shown. The base 81 for fixing is integrated with the second connector housing 76 and is fixed to the inner panel 51. In the packing groove, a packing 78 made of elastomer is incorporated.

In FIGS. 6 to 8, the terminal accommodation part 79 is formed as a part that accommodates the second terminal 77 provided at the other end of each of the two high voltage electric cables 72. The terminal accommodation part 79 is formed with a flexible lance 82 that latches the second terminal 77 and thus restrains deviation thereof. The terminal accommodation part 79 is formed to have a size that enables the second terminal 77 to move within a terminal following feasibility range S (refer to FIG. 6) at a state where the second terminal 77 is latched to the lance 82. In the meantime, the terminal following feasibility range S and the flexibility of the high voltage electric cable 72, which are necessary when moving the second terminal 77, are referred to as a second terminal moving mechanism 83. As described below, the second terminal moving mechanism 83 is provided as a mechanism that absorbs a positional deviation of the terminal.

The connector fitting part 80 is formed as a part that is fitted to the connector fitting part 69 of the first conductive path 43. A groove 84 is formed around the connector fitting part 80. The groove 84 is formed as a part into which an opening end of the connector fitting part 69 of the first conductive path 43 is inserted.

In FIGS. 6, 7 and 9, the second terminal 77 is a female terminal that is formed by press machining a conductive metal plate, has an electric contact part 85 and a conductor connection part 86 that continues to the electric contact part 85 and is formed as shown. The electric contact part 85 has a substantial box shape and is formed with a lance engaging hole 87. In the electric contact part 85, a pressing member 89 is provided which presses the first terminal 60 of the first connection part 47 of the first conductive path 43 toward a substrate part 88. The pressing member 89 has an elastic contact piece 90. The conductor connection part 86 is formed as a part that connects the conductor 73 of the high voltage electric cable 72 by caulking.

In the meantime, the second terminal 77 is adapted to move within the terminal following feasibility range S (refer to FIG. 6) by the second terminal moving mechanism 83. The second terminal 77 is configured so that a side part 91 (refer to FIG. 9) of the electric contact part 85 slides on an inner surface of the terminal accommodation part 79 when the second terminal is moved.

In the below, an assembling operation of the parts according to an embodiment is described based on the above configurations and structures.

On an assembling line of an automobile, an operation of assembling the battery 54 shown in FIG. 3 at a predetermined position is first performed. Since the battery 54 is large and heavy, it is first assembled in an operation sequence. At this time, regarding the junction block 53 that is integrated with the battery 54, the second connection part 50 that is one constitutional member is fixed to the inner panel 51, as shown in FIG. 2. Then, an operation of arranging the first conductive path 43 in substantially parallel with the panel member 41 is performed at the lower side 42 of the floor. When arranging the first conductive path 43, the through-hole 48 of the panel member 41 is water-tightly covered by the first connection part 47. The connection leading end portion 59 of the first connection part 47 is inserted into the through-hole 48 of the panel member 41, so that it is electrically connected with the second conductive path 45. The connection of the first conductive path 43 and the second conductive path 45 is performed in the vicinity of the through-hole 48.

As can be seen from the above assembling operation, in the operation, the first conductive path 43 is assembled with the first conductive path main body 46 not being retracted into the upper side 44 of the floor of the panel member 41. Therefore, the connection is performed by the simpler operation sequence than the related art. As the operation sequence is simplified, the operation management is also simplified.

Figure 10:
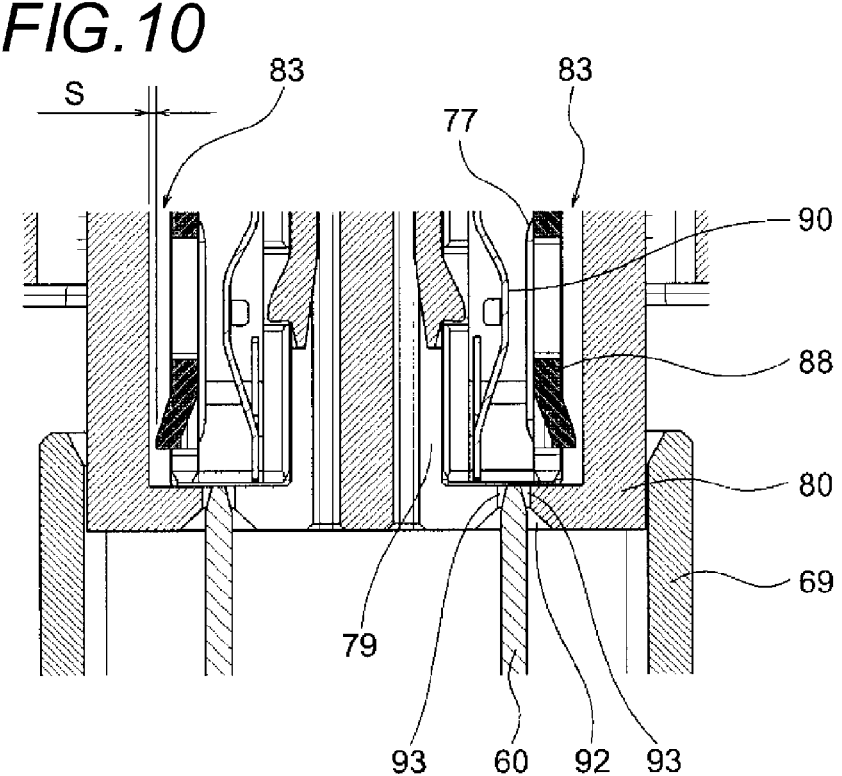
FIG. 10 illustrates an operation of a second terminal moving mechanism (which shows a state where there is no positional deviation and just before a first terminal is connected).
Figure 11:
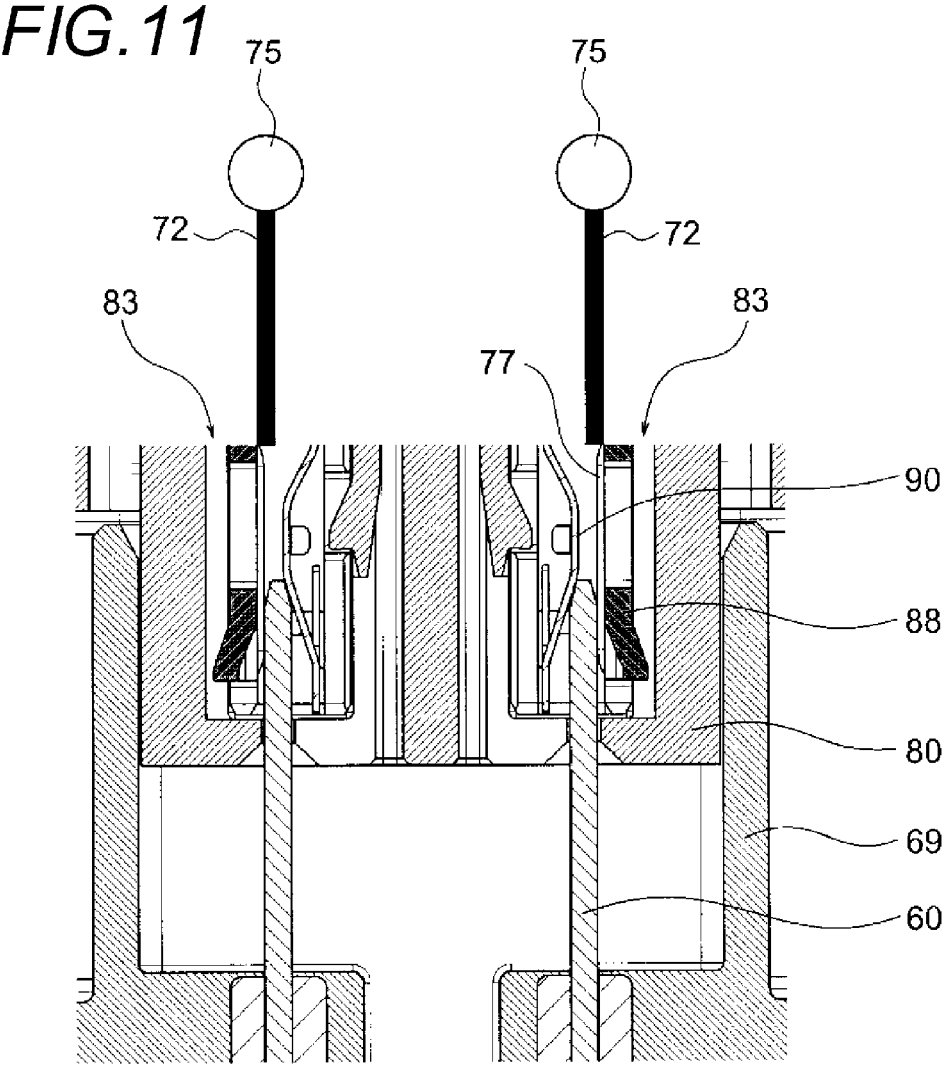
FIG. 11 illustrates an operation of the second terminal moving mechanism (which shows a state where there is no positional deviation and while the first terminal is being connected).
Figure 12:
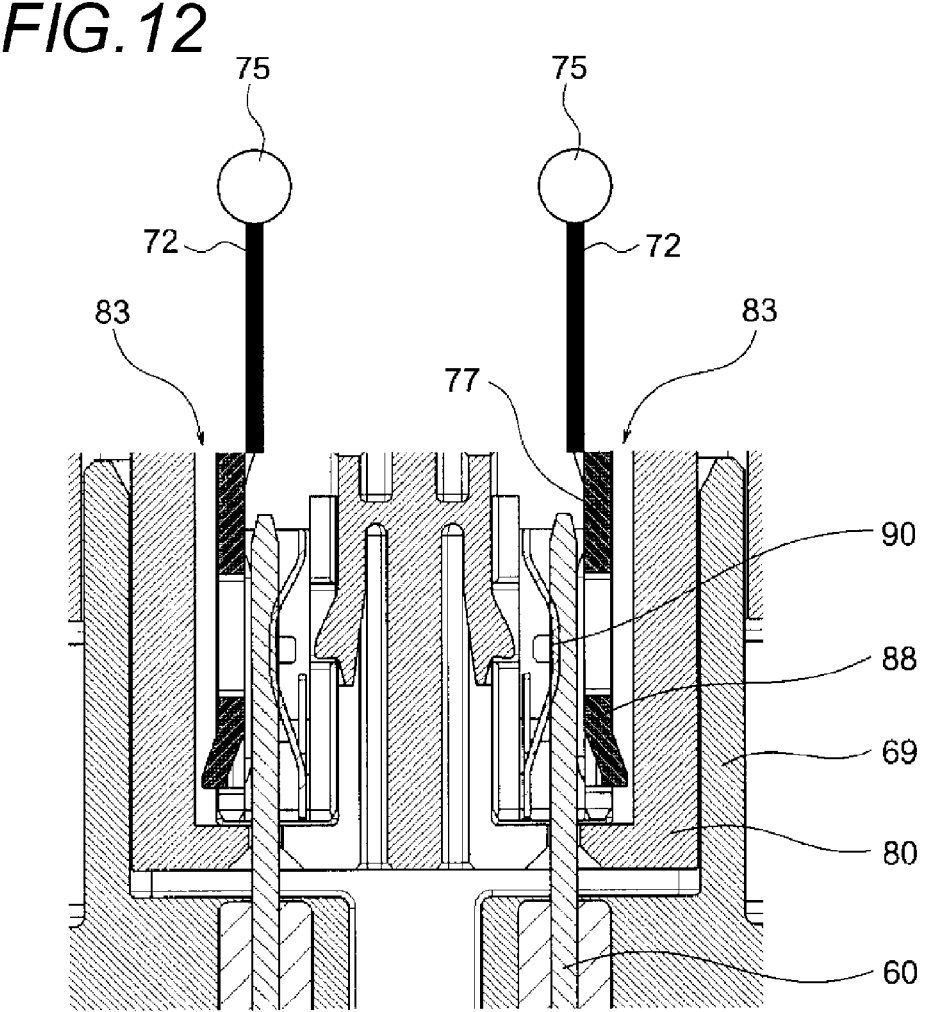
FIG. 12 illustrates an operation of the second terminal moving mechanism (which shows a state where there is no positional deviation and just after the first terminal is connected).
Figure 13:
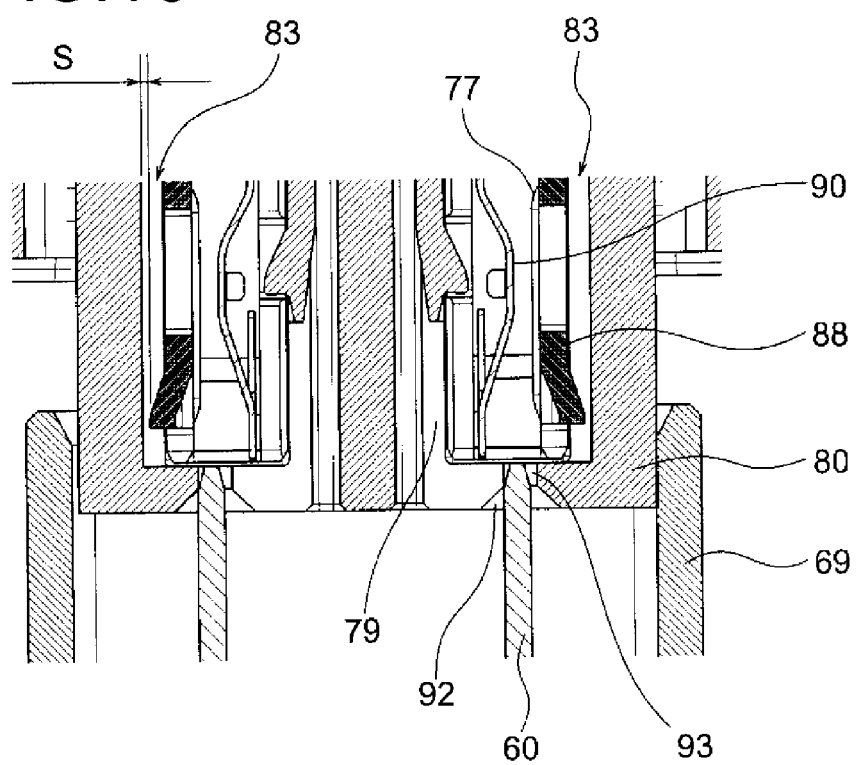
FIG. 13 illustrates an operation of the second terminal moving mechanism (which shows a state where there is a left positional deviation and just before the first terminal is connected).
Figure 14:
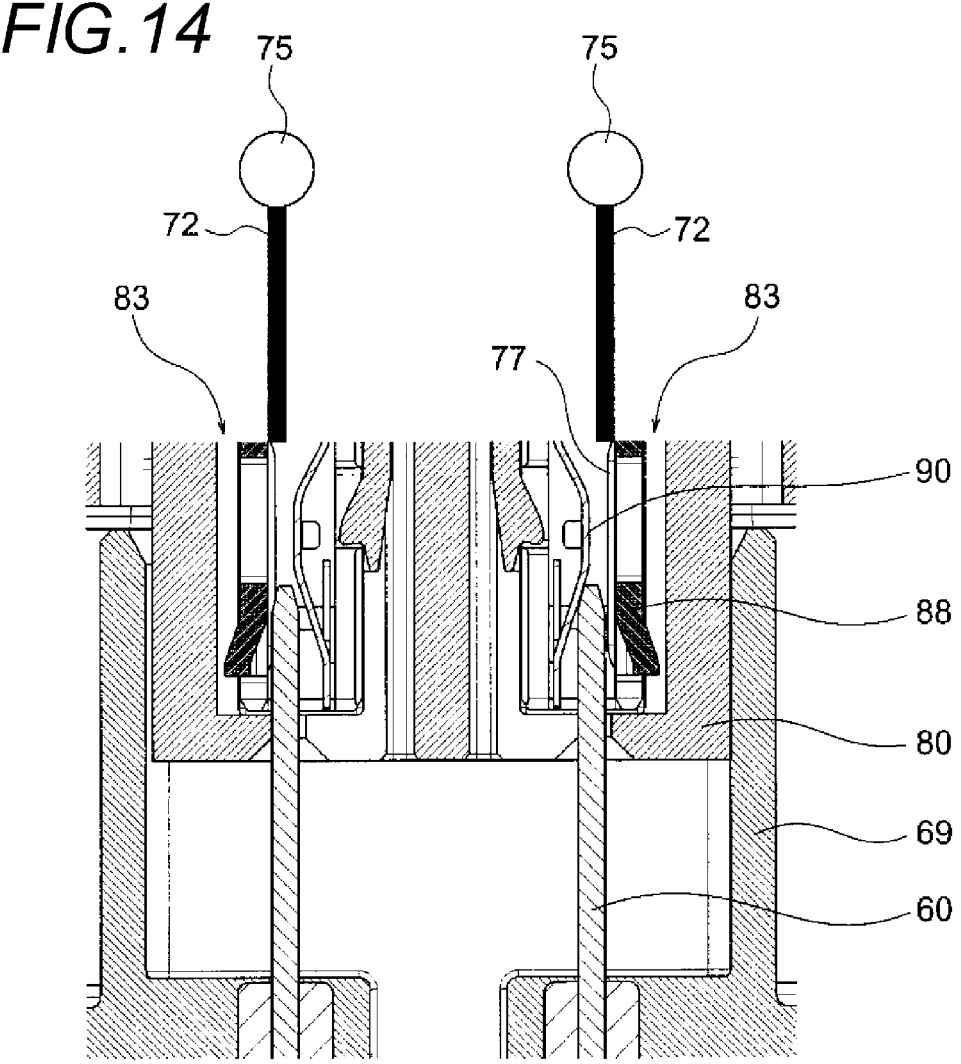
FIG. 14 illustrates an operation of the second terminal moving mechanism (which shows a state where there is the left positional deviation and while the first terminal is being connected).
Figure 15:
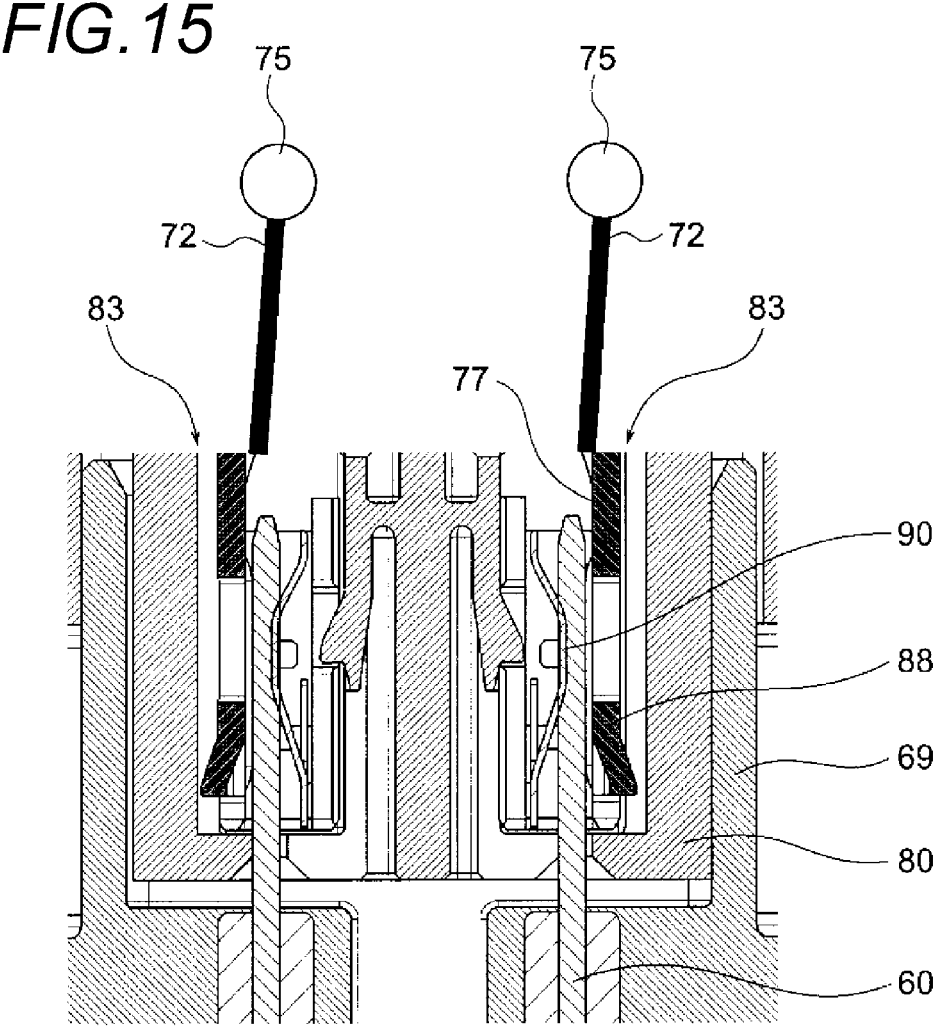
FIG. 15 illustrates an operation of the second terminal moving mechanism (which shows a state where there is the positional deviation and just after the first terminal is connected).
Figure 16:
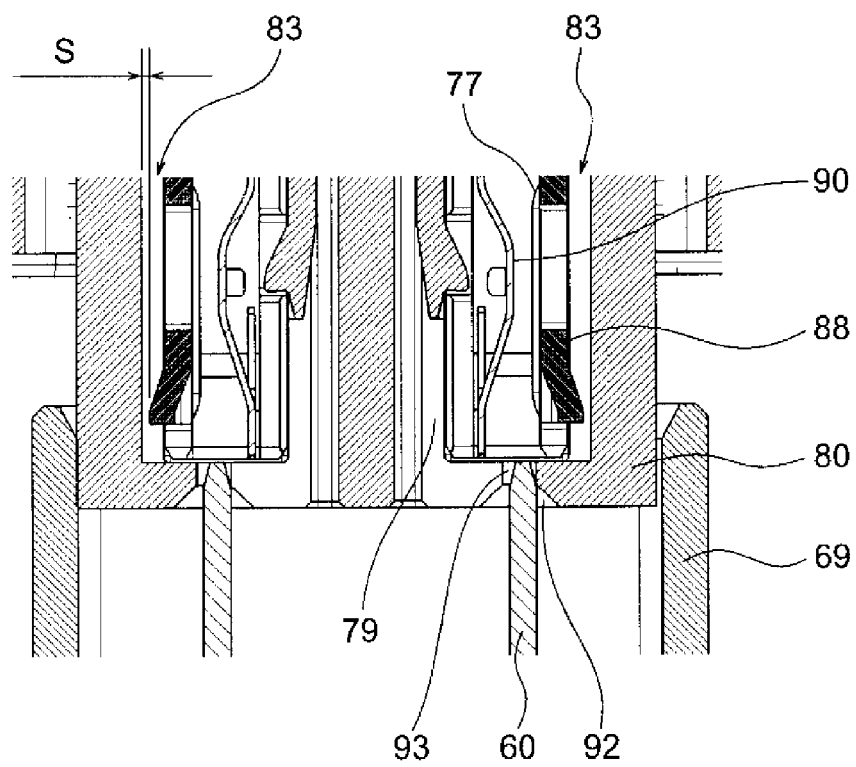
FIG. 16 illustrates an operation of the second terminal moving mechanism (which shows a state where there is a right positional deviation and just before the first terminal is connected).
Figure 17:
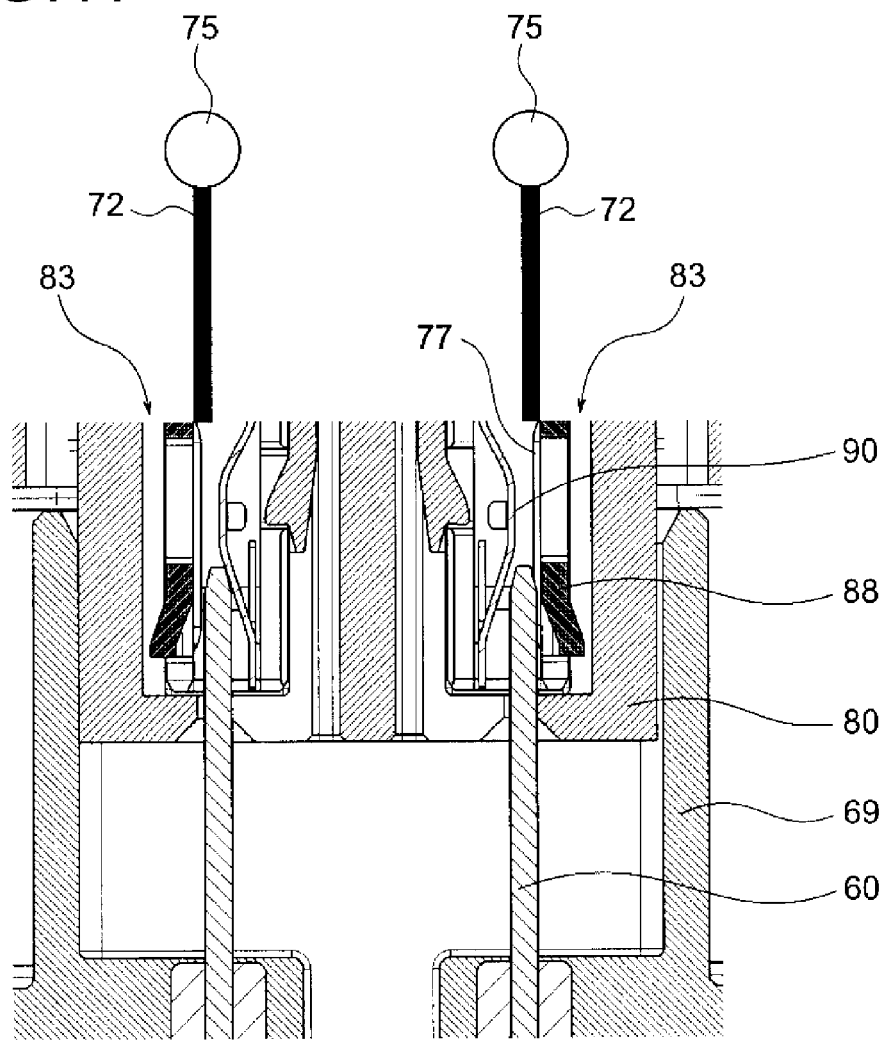
FIG. 17 illustrates an operation of the second terminal moving mechanism (which shows a state where there is the right positional deviation and while the first terminal is being connected).
Figure 18:
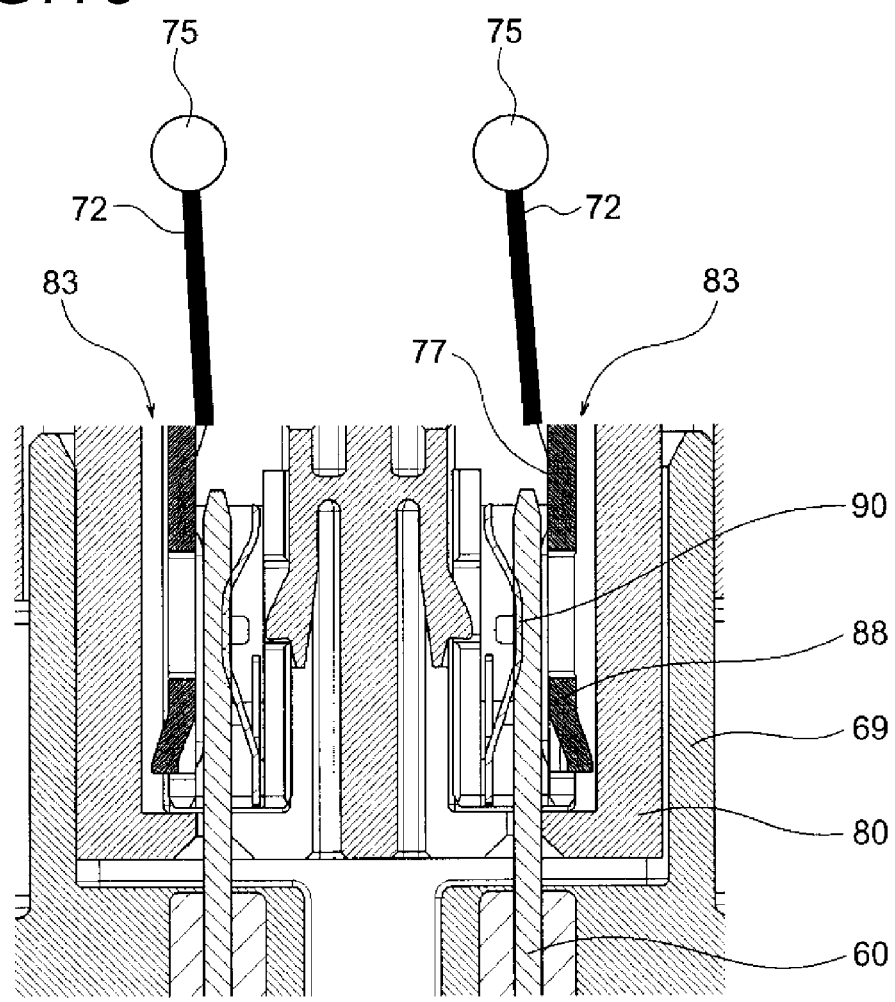
FIG. 18 illustrates an operation of the second terminal moving mechanism (which shows a state where there is the right positional deviation and just after the first terminal is connected).

Subsequently, the operation of the second terminal moving mechanism 83 is described with reference to FIGS. 10 to 18. FIGS. 10 to 12 illustrate operations when there is no positional deviation, FIGS. 13 to 15 illustrate operations when there is a left positional deviation and FIGS. 16 to 18 illustrate operations when there is a right positional deviation. Meanwhile, in the illustrative views, the high voltage electric cable 72 is schematicly shown.

<Operation at the Time when First Terminal 60 is not Positionally Deviated>

The connector connection starts as shown in FIG. 10 and the first terminals 60 are inserted into openings 92 that communicate with the terminal accommodation parts 79. At this time, the first terminal 60 is inserted into the opening 92 so that gaps 93 are formed at left and right sides in FIG. 10. As shown in FIG. 11, the first terminals 60 are inserted into the second terminals 77 and are brought into contact with the elastic contact pieces 90. Since the first terminals 60 are not positionally deviated, when the first terminals pass between the elastic contact pieces 90 and the substrate parts 88, they are inserted while the second terminals 77 are slightly moved (little moved). Then, as shown in FIG. 12, when the first terminals 60 are completely inserted, the first terminals 60 and the second terminals 77 are completely connected. In the meantime, since the second terminals 77 are slightly moved (little moved) as described above, the deflection resulting from the moving is not caused in the high voltage electric cables 72 when there is no positional deviation.

<Operation at the Time when First Terminal 60 is Leftward Positionally Deviated>

The connector connection starts as shown in FIG. 13 and the first terminals 60 are inserted into the openings 92 that communicate with the terminal accommodation parts 79. At this time, the first terminal 60 is inserted into the opening 92 so that a gap 93 is formed at a right side in FIG. 13. That is, the first terminals 60 are inserted with being leftward positionally deviated. As shown in FIG. 14, the first terminals 60 are inserted into the second terminals 77 and are brought into contact with the elastic contact pieces 90 (in FIG. 13, the first terminal is first contacted to the right elastic contact piece 90 and then to the left). Since the first terminals 60 are leftward positionally deviated, when the first terminals pass between the elastic contact pieces 90 and the substrate parts 88, they are inserted while the second terminals 77 are moved leftward in FIG. 14. Then, as shown in FIG. 15, when the first terminals 60 are completely inserted, the first terminals 60 and the second terminals 77 are completely connected. Since the second terminals 77 are moved leftward as described above, the leftward positional deviations of the first terminals 60 are absorbed. The high voltage electric cables 72 are deflected while following the moving.

<Operation at the Time when First Terminal 60 is Rightward Positionally Deviated>

The connector connection starts as shown in FIG. 16 and the first terminals 60 are inserted into the openings 92 that communicate with the terminal accommodation parts 79. At this time, the first terminal 60 is inserted into the openings 92 so that a gap 93 is formed at a left side in FIG. 16. That is, the first terminals 60 are inserted with being rightward positionally deviated. As shown in FIG. 17, the first terminals 60 are inserted into the second terminals 77 and are brought into contact with the elastic contact pieces 90 (in FIG. 17, the first terminal is first contacted to the left elastic contact piece 90 and then to the right). Since the first terminals 60 are rightward positionally deviated, when the first terminals pass between the elastic contact pieces 90 and the substrate parts 88, they are inserted while the second terminals 77 are moved rightward in FIG. 17. Then, as shown in FIG. 18, when the first terminals 60 are completely inserted, the first terminals 60 and the second terminals 77 are completely connected. Since the second terminals 77 are moved rightward as described above, the rightward positional deviations of the first terminals 60 are absorbed. The high voltage electric cables 72 are deflected while following the moving.

As described above with reference to FIGS. 10 to 18, it is possible to absorb the positional deviation of each terminal by the second terminal moving mechanism 83. When it is possible to absorb the positional deviation of each terminal, like this embodiment, it is possible to smoothly perform the operation.

The second terminal moving mechanism 83 is useful when connecting the first conductive path 43 and the second conductive path 45 in the vicinity of the through-hole 48 of the panel member 41 (refer to FIG. 2).

SECOND EMBODIMENT

In the below, a second embodiment is described with reference to the drawings. FIGS. 19(a) and 19(b) show a connector connection part showing the connection structure of conductive paths according to an embodiment of the invention, in which FIG. 19(a) is a perspective view and FIG. 19(b) is a plan view. In the meantime, the same constitutional members as the first embodiment are indicated with the same reference numerals and the detailed descriptions thereof are omitted.

In FIGS. 19(a) and 19(b), the second embodiment is different from the first embodiment in that the second conductive path main body 49 of the first conductive path 45 are made of two high voltage braid bus bars 72'. The high voltage braid bus bar 72' has the same function as the high voltage electric cable 72 (refer to FIG. 4(a)). Also, the high voltage braid bus bar has flexibility. Therefore, the second embodiment realizes the same effects as the first embodiment.

THIRD EMBODIMENT

Figure 20:
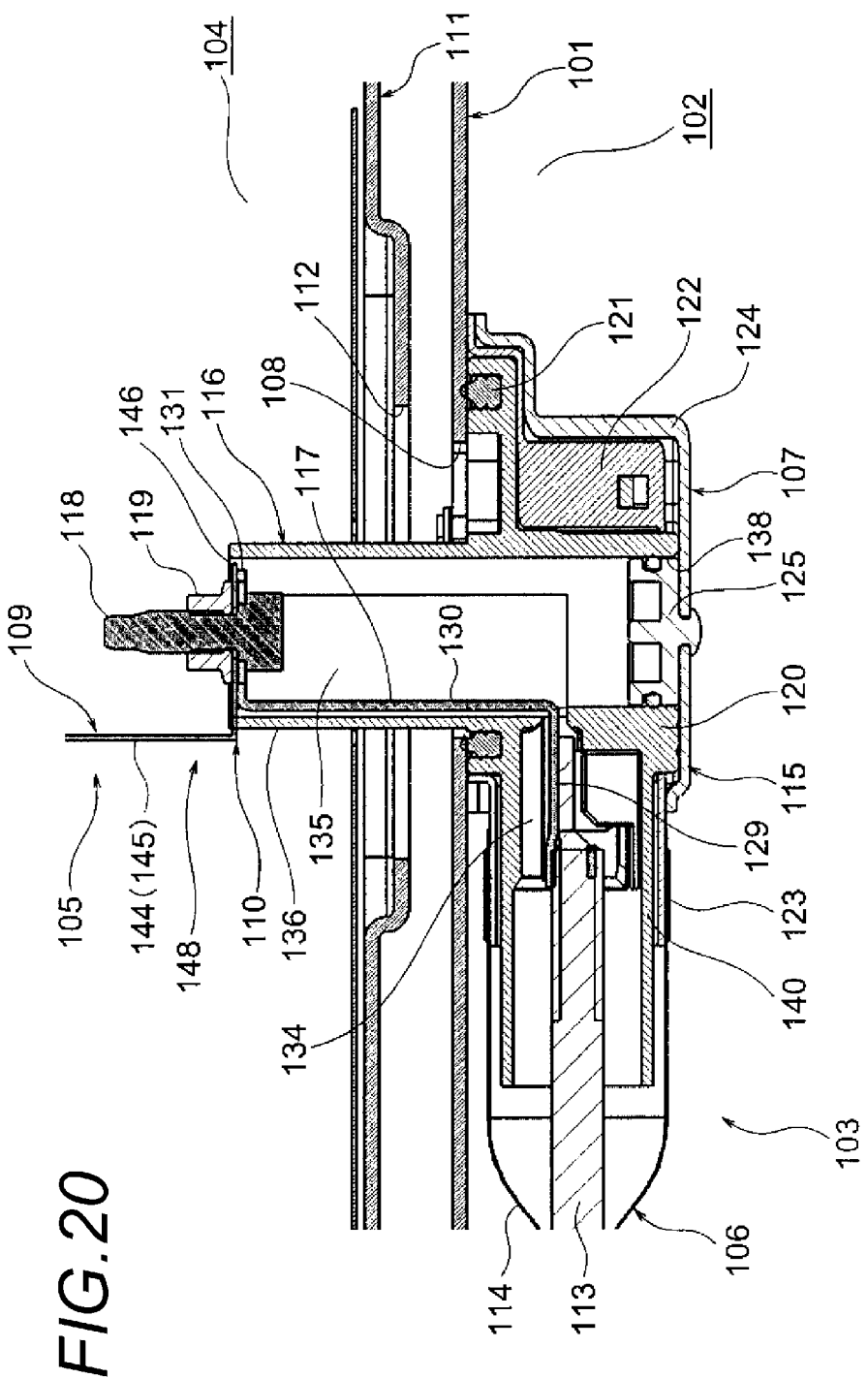
FIG. 20 is a sectional view showing a connection structure of conductive paths according to an embodiment of the invention (third embodiment)
Figure 21:
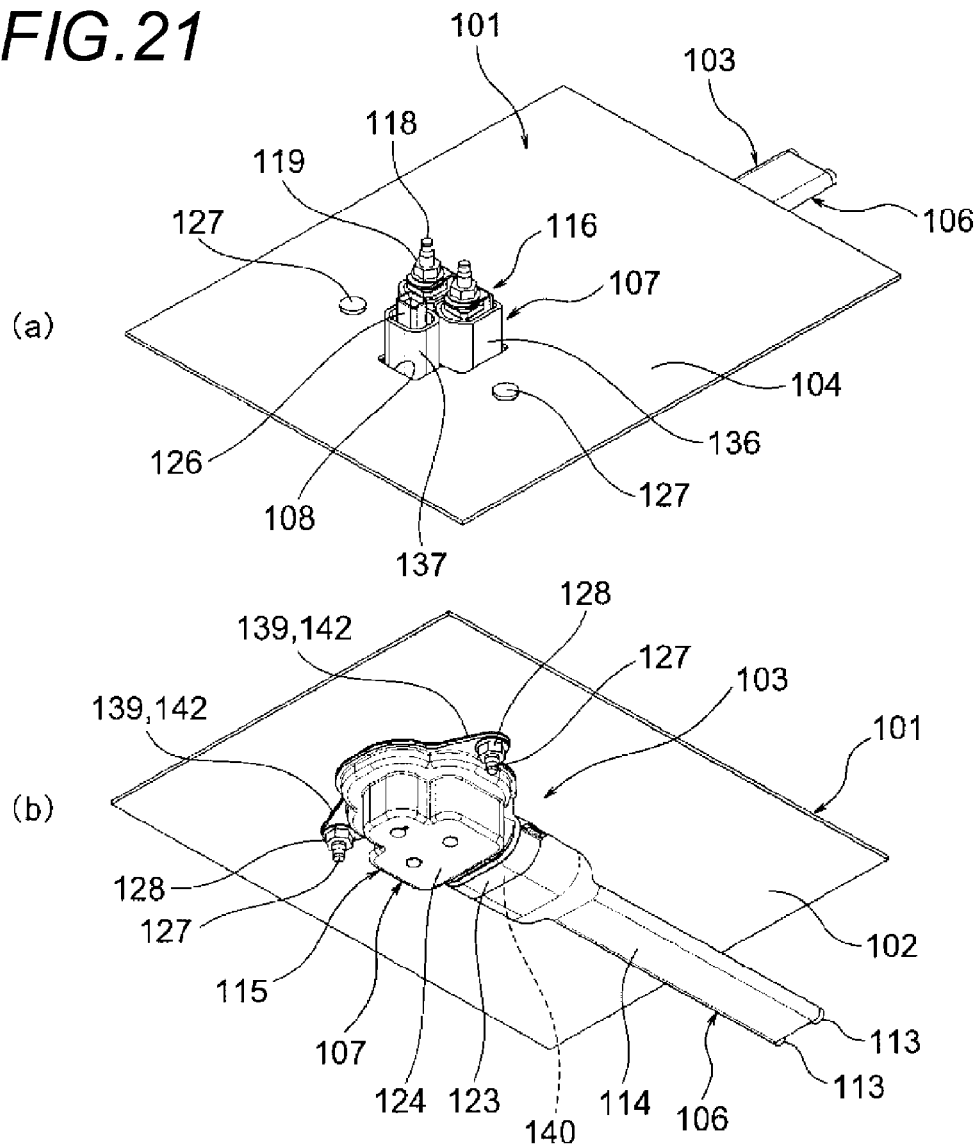
Figure 22:
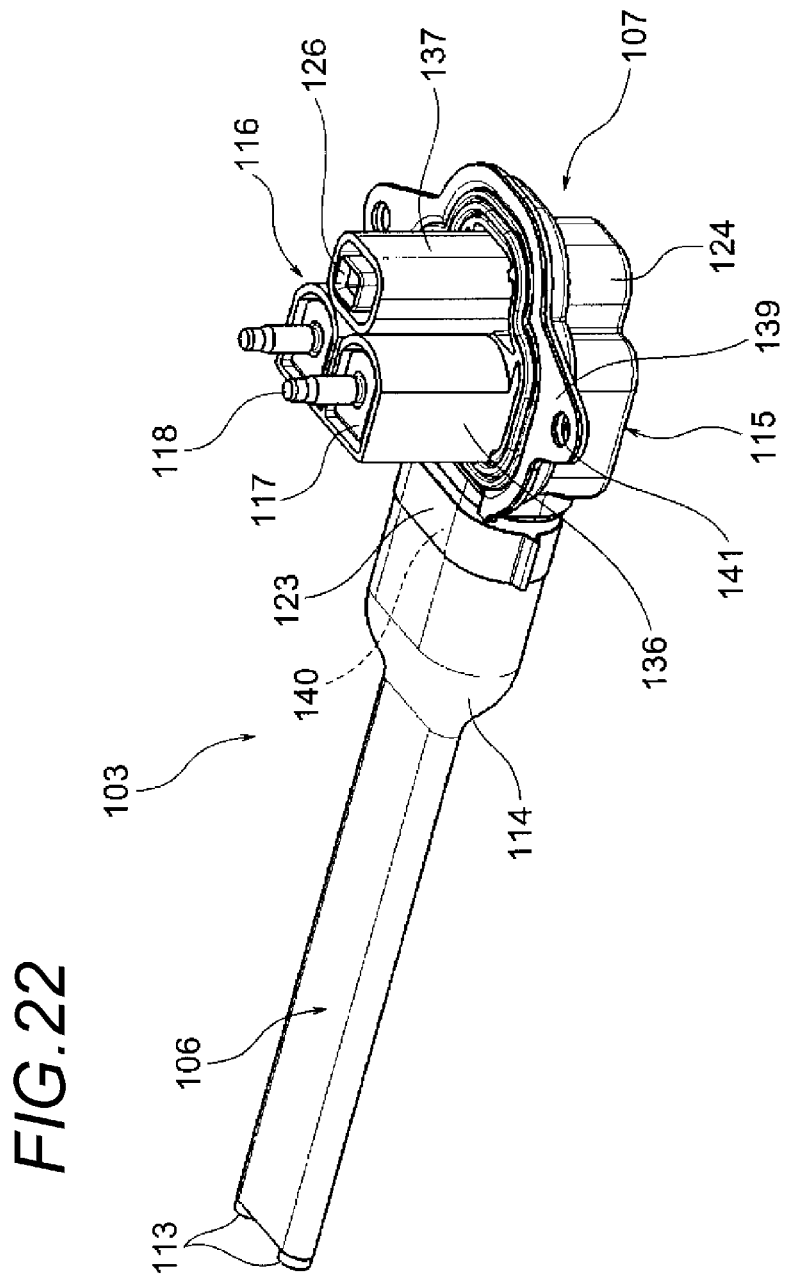
FIG. 22 is a perspective view of the first conductive path.
Figure 23:
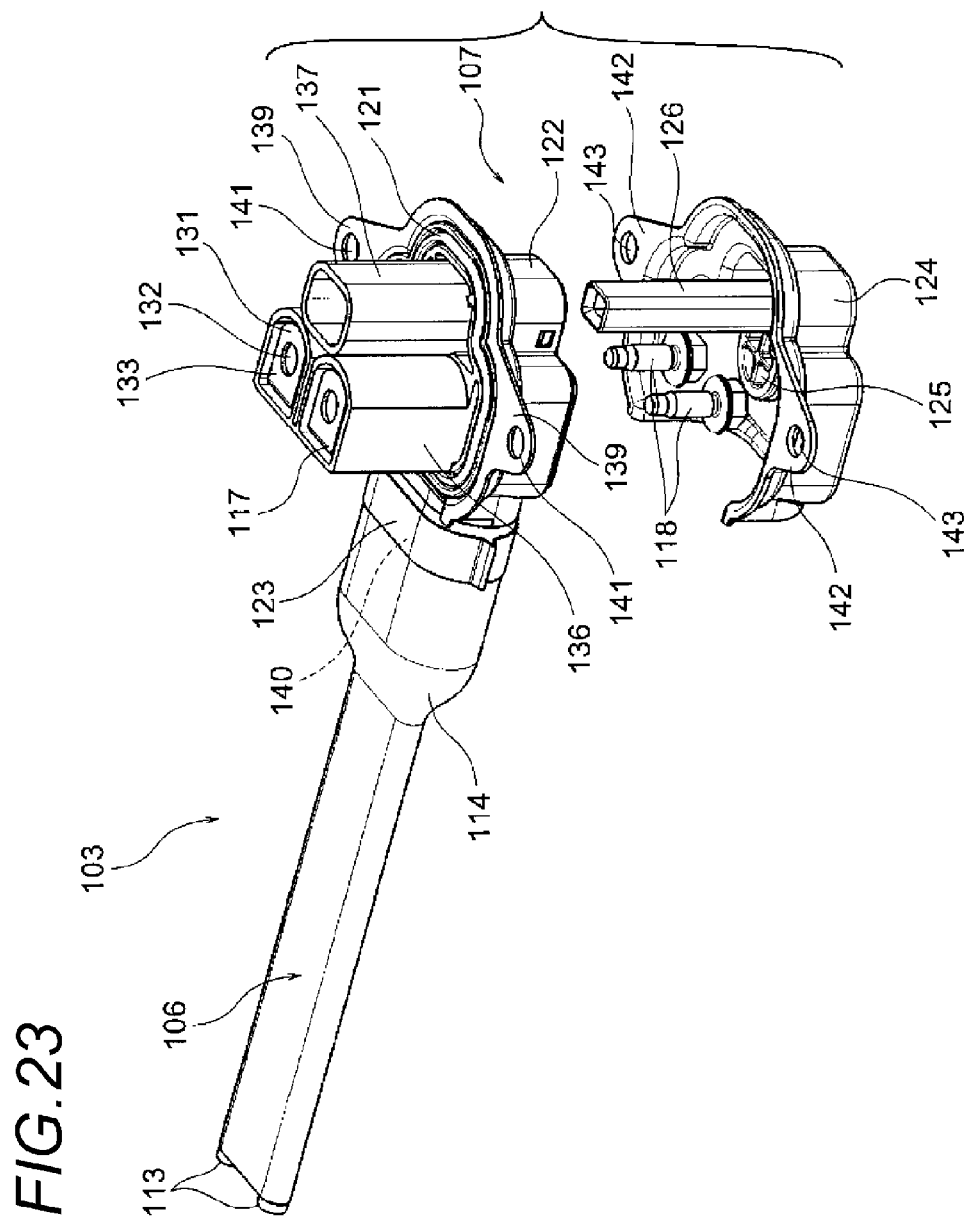
FIG. 23 is an exploded perspective view of the first conductive path.
Figure 24:
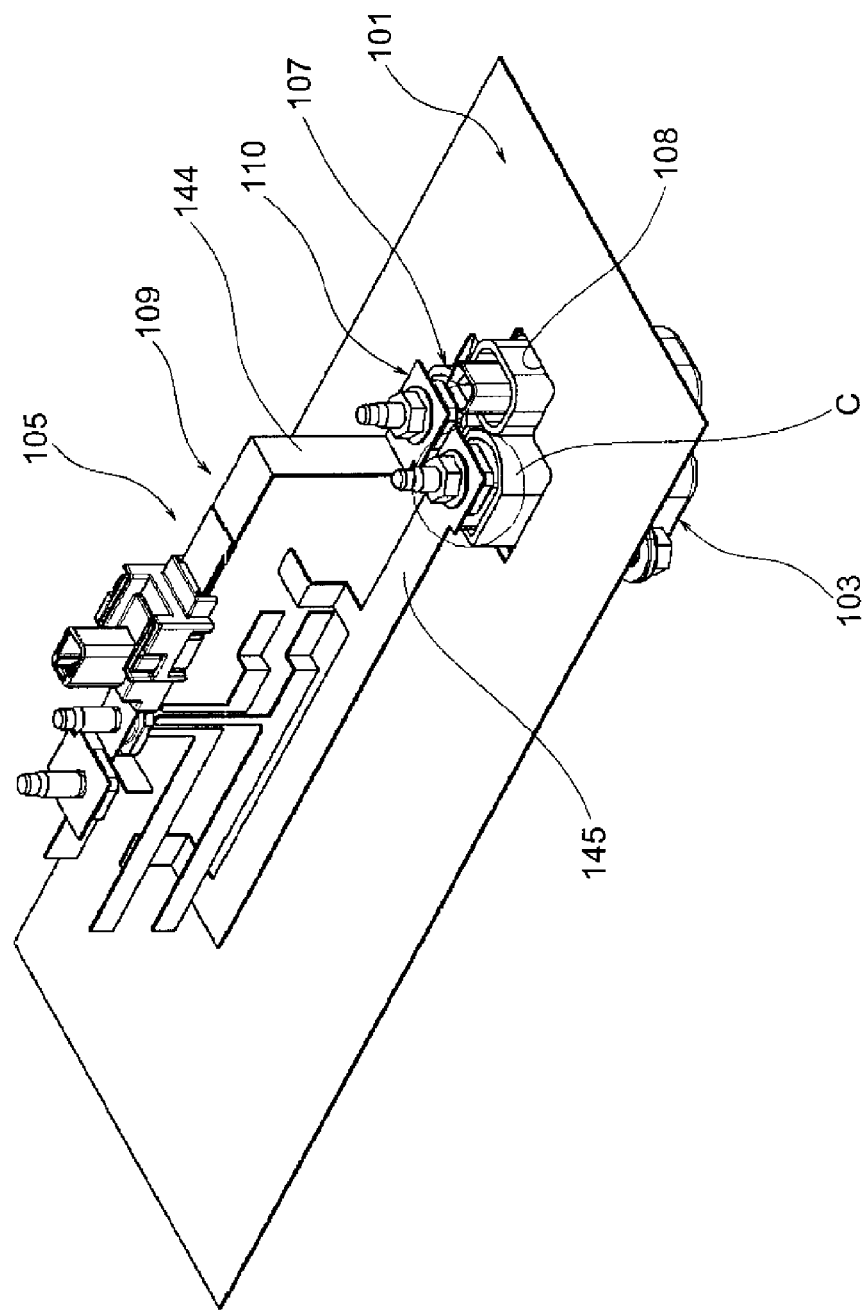
FIG. 24 is a perspective view showing a connected state of the first conductive path and a second conductive path.
Figure 25:
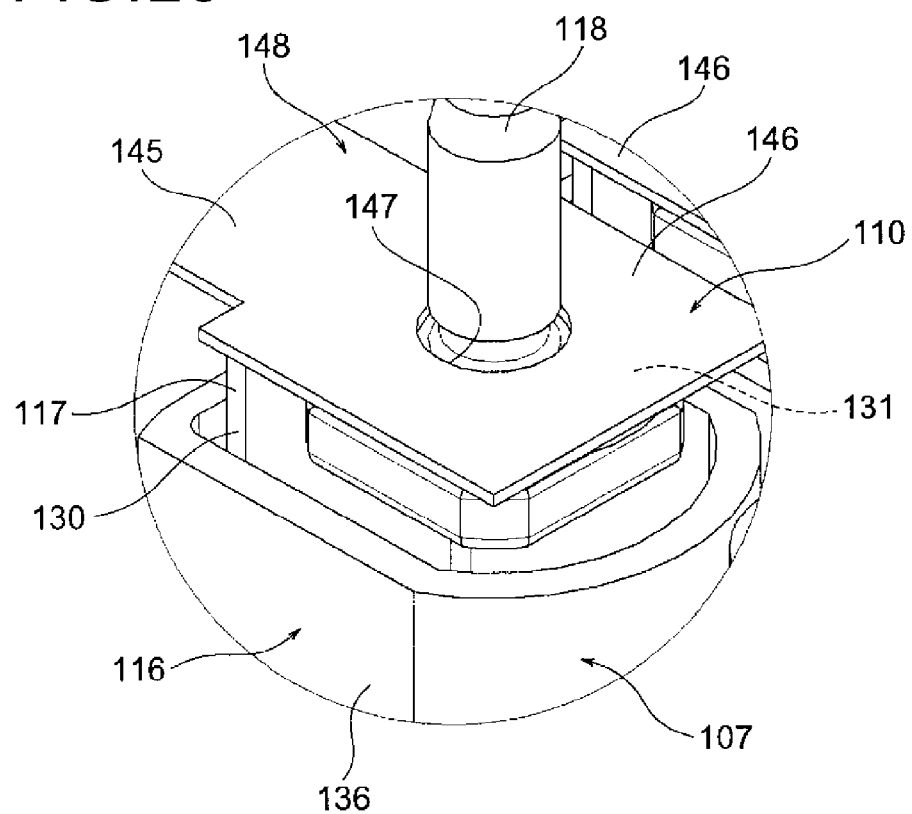
FIG. 25 is an enlarged view of a circle C of FIG. 24.
Figure 26:
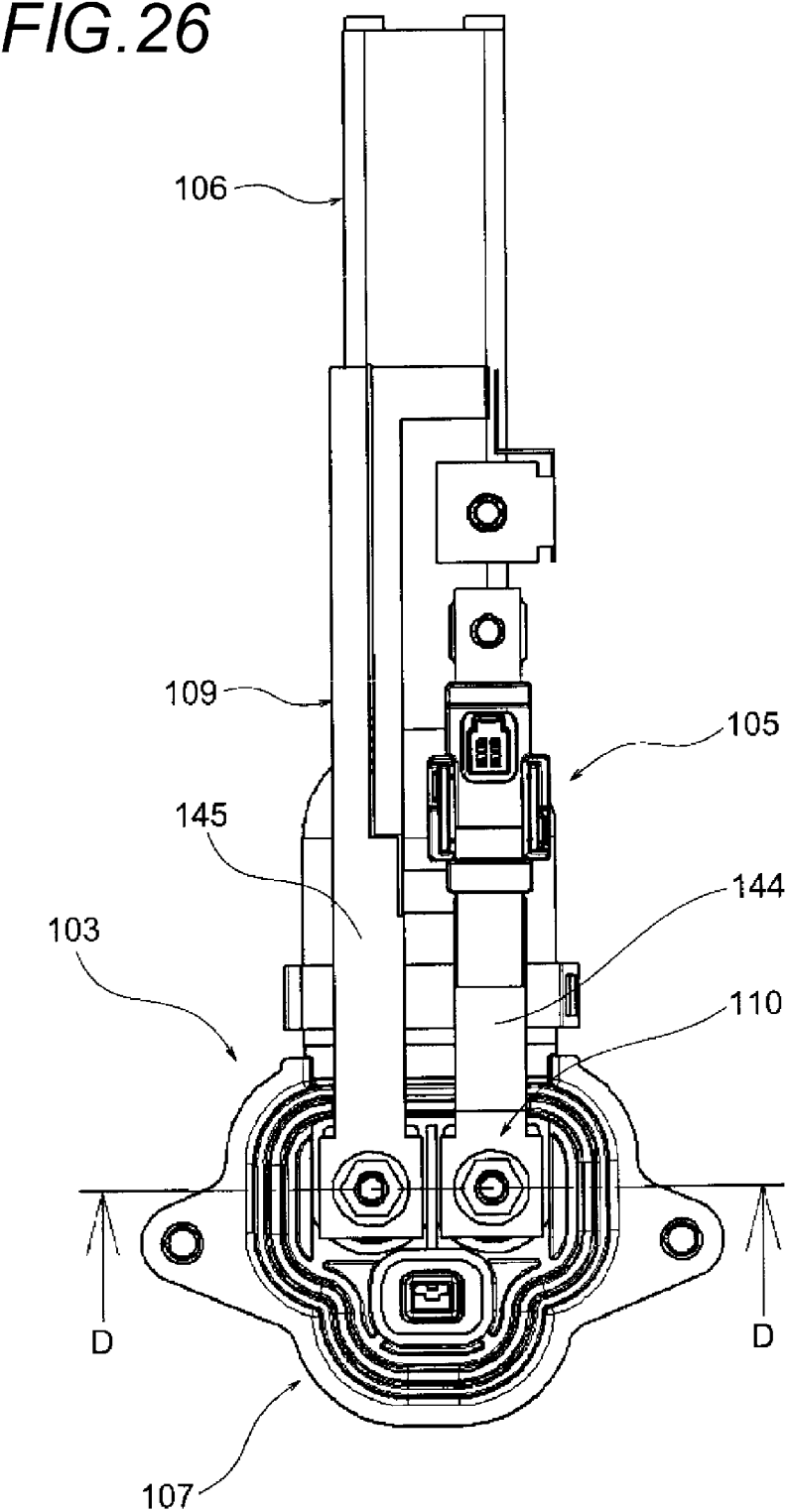
FIG. 26 is a plan view showing a connected state of the first conductive path and the second conductive path.
Figure 27:
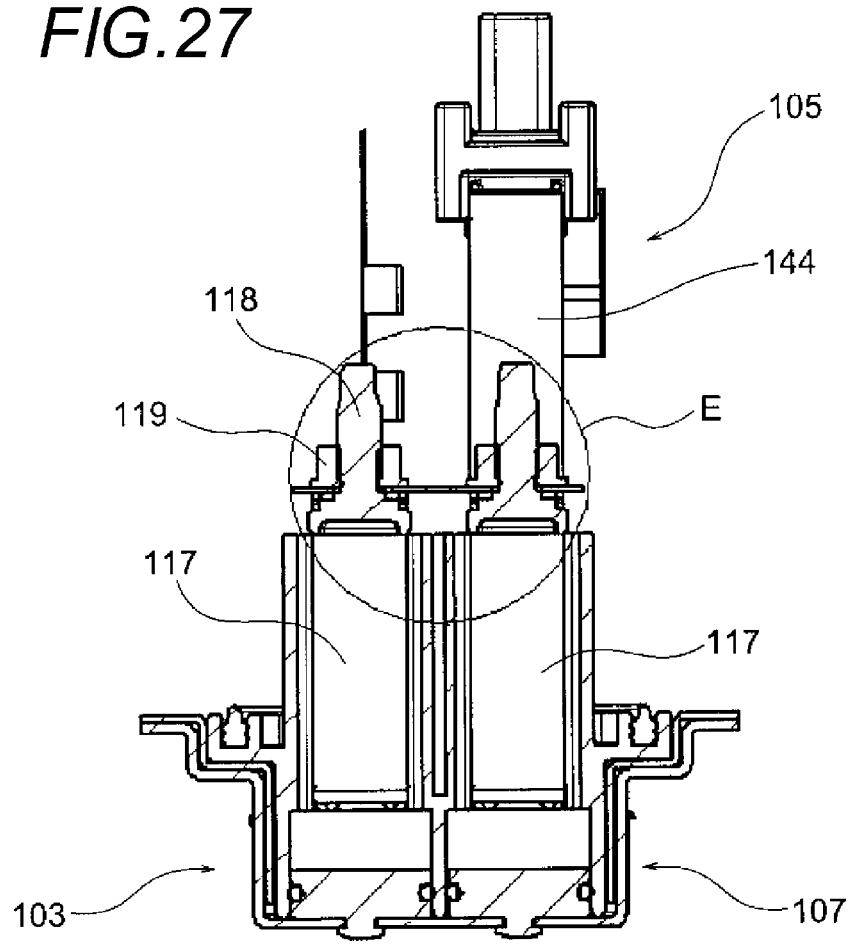
FIG. 27 is a sectional view taken along a line D-D of FIG. 26.
Figure 28:
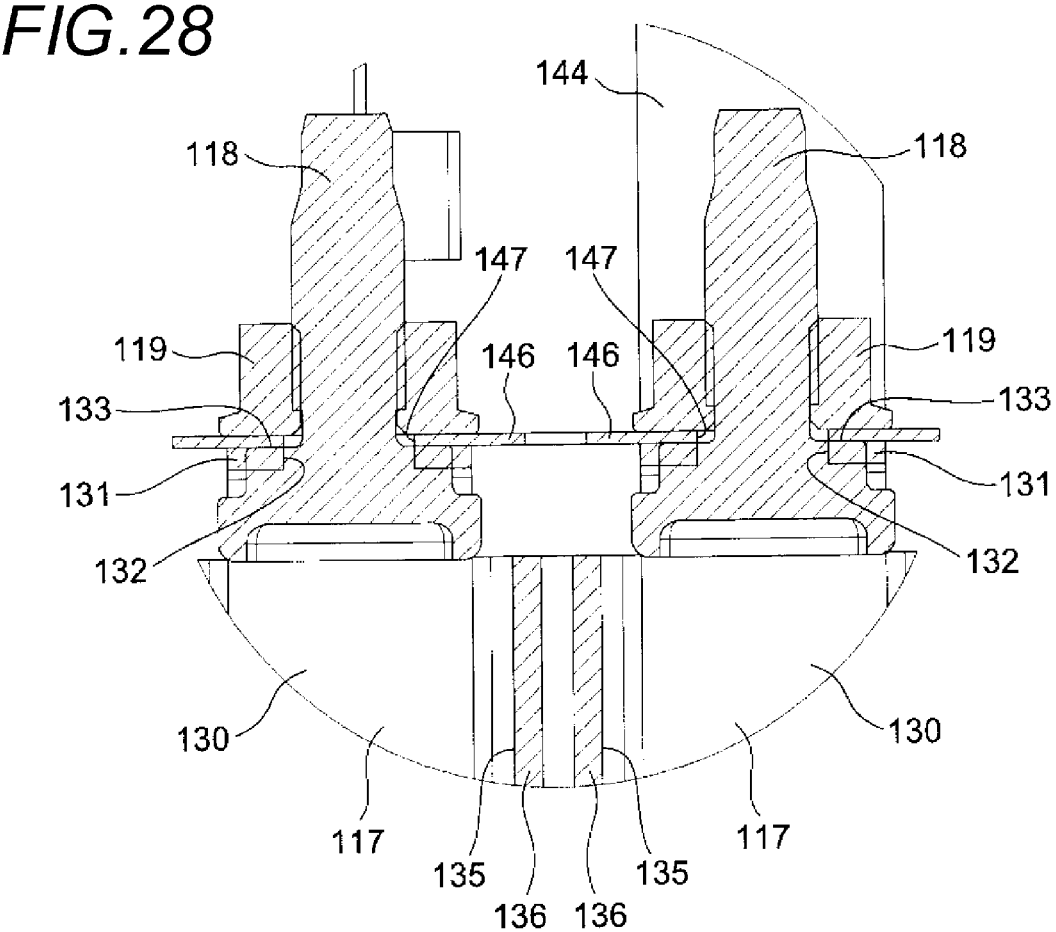
FIG. 28 is an enlarged view of a circle E of FIG. 27.
Figure 29:
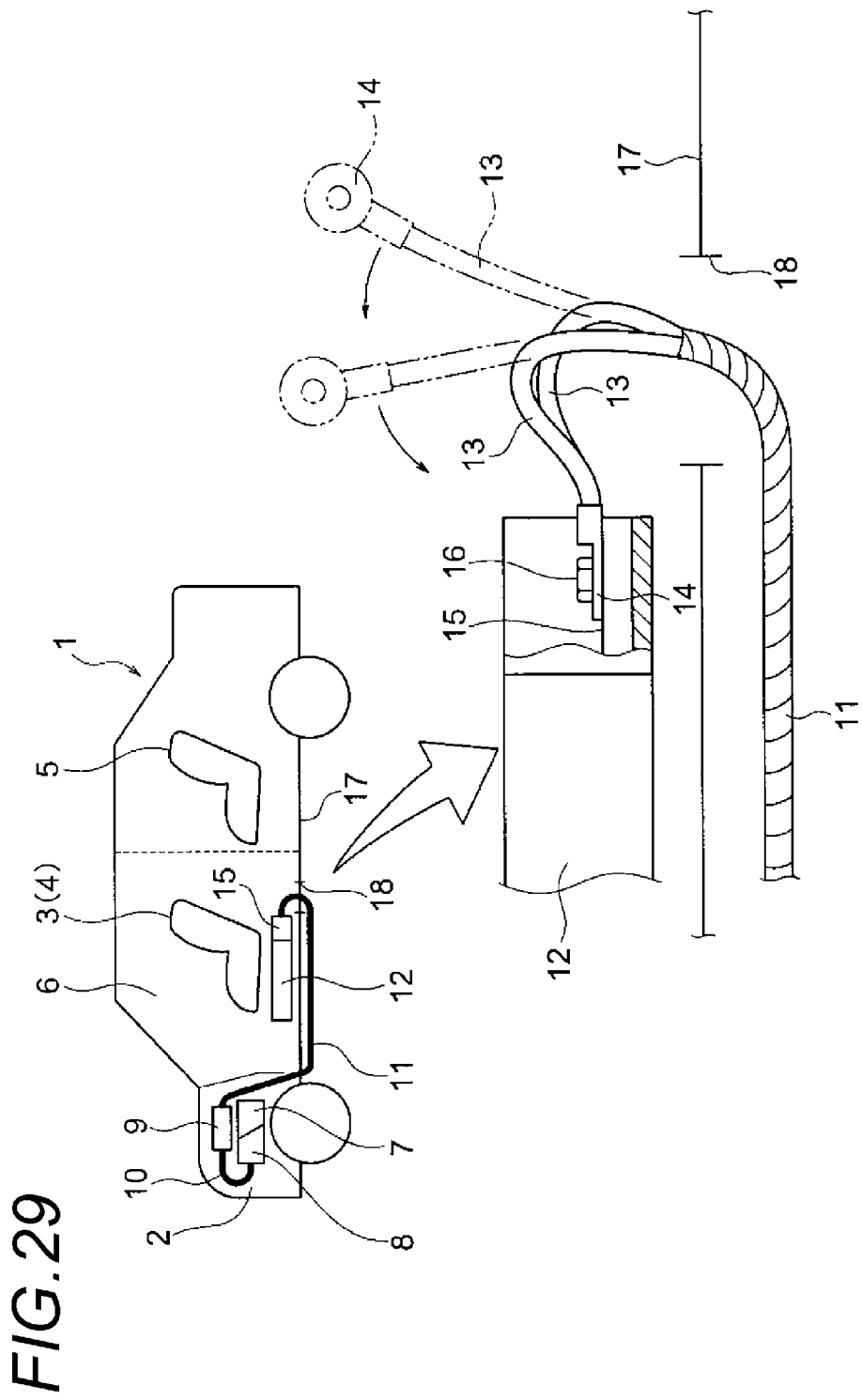
FIG. 29 is a schematic view of an automobile showing a wire harness arrangement structure and a connection structure according to the related art.

In the below, a third embodiment is described with reference to FIGS. 20 to 28. FIG. 20 is a sectional view showing the connection structure of conductive paths according to an embodiment of the invention, FIGS. 21(a) and 21(b) shows an arrangement of the first conductive path, FIG. 22 is a perspective view of the first conductive path, FIG. 23 is an exploded perspective view of the first conductive path, FIG. 24 is a perspective view showing a connected state of the first conductive path and a second conductive path, FIG. 25 is an enlarged view of a circle C of FIG. 24, FIG. 26 is a plan view showing a connected state of the first conductive path and the second conductive path, FIG. 27 is a sectional view taken along a line D-D of FIG. 26 and FIG. 28 is an enlarged view of a circle E of FIG. 27.

In the third embodiment, the invention is applied to a hybrid automobile (alternatively, electric automobile), like the first and second embodiments.

In FIG. 20, a first conductive path 103 is arranged at a lower side 102 (first surface side) of a floor of a panel member 101 serving as a body. Also, a second conductive path 105 is arranged at an upper side 104 (second surface side) of the floor of the panel member 101. The panel member 101 has conductivity and rigidness enabling body earth.

The first conductive path 103 is arranged in substantially parallel with the panel member 101. That is, the first conductive path 103 is arranged at a distance from a ground. The first conductive path 103 has a structure having a low height so that it is arranged at a distance from the ground. The first conductive path 103 has a first conductive path main body 106, a first connection part 107 that is provided at one end of the first conductive path main body 106 and a connection part (not shown) for an inverter unit that is provided at the other end of the first conductive path main body 106. The first consecutive path 103 consists of a high voltage wire harness. The first conductive path 103 is configured so that a direction substantially orthogonal to the arranging direction (arranging direction along the panel member 101) is to be a connection direction with the second conductive path 105. The first conductive path 103 is configured so that it is connected to the second conductive path 105 after a part of the first connection path 107 is inserted into a through-hole 108 of the panel member 101.

The second conductive path 105 has a second conductive path main body 109 and a second connection part 110 that is provided at one end of the second conductive path main body 109. The second connection part 105 has an arranging part in which the second conductive path main body 109 extends in a direction substantially orthogonal to the panel member 101 and an arranging part in which it extends in substantially parallel with the panel member (refer to FIG. 24). Unlike the first embodiment, the second connection part 110 has a structure where it is not fixed to an inner panel 111 that is provided at a predetermined interval inside the panel member 101 (which configuration is exemplary). The inner panel 111 is formed with a through-hole 112 for connection. In this embodiment, the second connection part 110 consists of only second terminals 146 that will be described later (which is exemplary).

The second conductive path 105 is provided as one constitutional member of a junction block (device), which is not particularly shown. The junction block is provided on one sidewall of a battery (device), which is not shown. The junction block and the battery are devices that are arranged at an opposite side to the panel member 101 and the inner panel 111, when seen from the first conductive path 103. The first conductive path 103 is configured so that it can be directly connected to the devices.

In the below, the respective configurations of the first conductive path 103 and the second conductive path 105 are more specifically described.

In FIGS. 20 to 23, the first conductive path main body 106 of the first conductive path 103 has two high voltage electric cables 113 and an electromagnetic shield member 114 that collectively shields the two high voltage electric cables 113. The high voltage electric cable 113 is a conductive path including a conductor and an insulator (cover) and is formed to have a length that is necessary for electrical connection. The conductor is made of copper, copper alloy or aluminum. The conductor may have any of a conductor structure consisting of wires twisted each other and a conductor structure of a rod shape having a rectangular or circular section (for example, a conductor structure consisting of a single core of a straight angel or round single core). The high voltage electric cable 113 has a non-shielded electric cable configuration.

Meanwhile, in this embodiment, the high voltage electric cable 113 is adopted. However, the invention is not limited thereto. That is, a configuration where an insulator is provided to a known bus bar may be also used.

The electromagnetic shield member 114 is a member for electromagnetic shield (a member for electromagnetic wave measures) that covers the two high voltage electric cables 113) and is formed into a cylindrical shape by a braid having a plurality of extremely thin conductive wires. The electromagnetic shield member 114 has a length that is the substantially same as the entire length of the two high voltage electric cables 113.

In this embodiment, the electromagnetic shield member 114 is formed of the braid. However, the invention is not limited thereto. That is, a shield member made of a metal foil, a single body of a metal foil and the like may be also used inasmuch as it can take measures for electromagnetic waves.

The first connection part 107 consists of a plurality of constitutional members and has a substantial L section. In the first connection part 107 having such a shape, a part parallel with the panel member 101 can be referred to as a connection base end portion 115 (main body part) and a part orthogonal thereto can be referred to as a connection leading end portion 116. The connection base end portion 115 is formed as a functional part that fixes one end of the first conductive path main body 106. Also, the connection leading end portion 116 is formed as a functional part that makes the electrical connection with the second conductive path 105.

The first connection part 107 has first terminals 117, connection bolts 118, connection nuts 119, a first connector housing 120, a packing 121 (seal member), a shield shell 122, a shield member holding ring 123, a cover 124, a waterstop part 125, a fitting detection member 126, fixing bolts 127 and fixing nuts 128. The first connection part 107 is formed such a shape that the first terminals 117 and the first connector housing 120 extend over the connection base end portion 115 and the connection leading end portion 116.

The first terminal 117 is a conductive metal member and has a first terminal base end portion 129 that is connected to the conductor of the high voltage electric cable 113, a first terminal central part 130 that is connected to the first terminal base end portion 129 and extends in the orthogonal direction and a first terminal leading end portion 131 that is connected to the first terminal central part 130 to be orthogonal thereto. The first terminal 117 is formed by bending a strip-shaped piece (bus bar) into a crank shape. The first terminal leading end portion 131 is formed with a bolt insertion through-hole 132 and a second terminal contact surface 133 (refer to FIG. 23).

The first connector housing 120 is an insulating resin member, has a terminal accommodation part 134 that corresponds to the first terminal base end portion 129, a terminal accommodation part 135 that corresponds to the first terminal central part 130 and the first terminal leading end portion 131, an insertion cylinder part 136 that is inserted into the through-hole 108 of the panel member 101, an insertion cylinder part 137 for a fitting detection member that is inserted into the through-hole 108, an opening 138 for bolt insertion that communicates with the terminal accommodation part 135 and a packing groove (not shown) and is formed as shown.

The terminal accommodation part 135 is formed in the insertion cylinder part 136. The terminal accommodation part 135 and the insertion cylinder part 136 extend in the upper-lower direction (the orthogonal direction). An upper end of the insertion cylinder part 136 is opened to a connection position of the first terminal leading end portion 131 and the second connection part 110. In the meantime, as shown in FIGS. 20, 22 and 23, the upper end of the insertion cylinder part 136 may be positioned so that the insertion cylinder part 136 is lightly higher than the first terminal leading end portion 131 or so that the first terminal leading end portion 131 is higher, as shown in FIGS. 21, 24 and 25.

A lower end of the insertion cylinder part 136 is opened as the opening 138 for bolt insertion. The opening 138 for bolt insertion is formed so that the connection bolt 118 is inserted into the bolt insertion through-hole 132 of the first terminal leading end portion 131 from the lower side 102 of the floor. In the opening 138 for bolt insertion, the waterstop part 125 is water-tightly inserted. The waterstop part 125 is provided with being incorporated to the cover 124. The waterstop part 125 has a function of preventing water from being introduced into the terminal accommodation part 135.

The packing groove is formed to surround the through-hole 108 of the panel member 101. That is, the packing groove has an annular groove shape. In the packing groove, a packing 121 made of elastomer is incorporated. The packing 121 is closely contacted to a peripheral part of the through-hole 108 of the panel member 101, thereby forming a waterproof structure.

The shield shell 122 is a conductive metal member and has a shape that covers the first connector housing 120. The shield shell 122 is formed with panel member fixing parts 139 and a shield member connection part 140. The panel member fixing part 139 has a flange shape having a bolt insertion through-hole 141. In the bolt insertion through-hole 141, a fixing bolt 127 (refer to FIGS. 21(a) and 21(b)) for fixing the panel member fixing part 139 to the panel member 101 is inserted. The shield member connection part 140 is formed so that one end of the electromagnetic shield member 114 can be inserted to an outer side thereof. Also, the shield member connection part is formed so that it can be fixed by the shield member holding ring 123. The electromagnetic shield member 114 is body-earthed to the panel member 101 via the shield shell 122.

The cover 124 is a resin or metal member and has a shape that covers the shield shell 122. The cover 124 is formed with a panel member fixing part 142. The panel member fixing part 142 has a flange shape having a bolt insertion through-hole 143. In the bolt insertion through-hole 143, a fixing bolt 127 (refer to FIGS. 21(a) and 21(b)) is inserted. The fixing bolt 127 inserted into the bolt insertion through-hole 143 is engaged with the fixing nut 128 on an outer surface of the panel member fixing part 142.

In FIG. 24, the second conductive path main body 109 of the second conductive path 105 has two bus bars 144, 145. The bus bars 144, 145 are strip-shaped conductive paths and are respectively formed to have a length that is necessary for electrical connection. One ends of the respective bus bars 144, 145 are connected to a circuit of a junction block, which is not shown. In the meantime, the bus bars 144, 145 are connected to the circuit, so that they have a cantilever shape, respectively. Therefore, the bus bars have slight flexibility (swing) until the connection of the second terminal 146 (which will be described later) provided at the other end of each of the bus bars 144, 145 is completed.

In FIGS. 24 and 25, the second connection part 110 of the second conductive path 105 has the second terminal 146 having a rectangular flat plate shape that is connected to the other end of each of the bus bars 144, 145. The second terminal 146 is formed with a bolt insertion through-hole 147 into which the connection bolt 118 is inserted. The bolt insertion through-hole 147 has a size that is slightly larger than the bolt insertion through-hole 132 of the first terminal 117. In the meantime, the reason to make the size slightly larger than the bolt insertion through-hole 132 of the first terminal 117 is to absorb the positional deviation of the first terminal 117 when making the electrical connection. In this embodiment, the slightly larger bolt insertion through-hole 147 and the slight flexibility (swing) of the bus bars 144, 145 correspond to the second terminal moving mechanism 148. The bus bars 144, 145 having the second terminals 146 are adapted to move, like the first embodiment.

In the below, an assembling operation of the parts according to an embodiment is described based on the above configurations and structures.

On an assembling line of an automobile, an operation of assembling the battery (not shown) at a predetermined position is first performed.

Since the battery is large and heavy, it is first assembled in an operation sequence. At this time, regarding the junction block that is integrated with the battery, the second conductive path 105 that is one constitutional member is arranged at a predetermined position (refer to FIG. 24). Then, as shown in FIG. 20, an operation of arranging the first conductive path 103 in substantially parallel with the panel member 101 is performed at the lower side 102 of the floor. When arranging the first conductive path 103, the through-hole 108 of the panel member 101 is water-tightly covered by the first connection part 107. The connection leading end portion 116 of the first connection part 107 is inserted into the through-hole 108 of the panel member 101. Finally, the first conductive path 103 and the second conductive path 105 are connected by engaging the connection bolts 118 and the connection nuts 119 (refer to FIGS. 26 to 28). At this time, when there is a positional deviation, the second terminal 146 is moved, so that the positional deviation is absorbed. The connection of the first conductive path 103 and the second conductive path 105 is performed in the vicinity of the through-hole 108.

As can be seen from the above assembling operation, in the operation, the first conductive path 103 is assembled with the first conductive path main body 106 not being retracted into the upper side 104 of the floor of the panel member 101. Therefore, the connection is performed by the simpler operation sequence than the related art. As the operation sequence is simplified, the operation management is also simplified.

In the meantime, the above embodiments simply show the representative embodiments of the invention and the invention is not limited thereto. Also, a variety of modifications can be made without changing the gist of the invention.

In the above descriptions, the panel member is a body that is located at the lowest position of the automobile. However, the invention is not limited thereto. That is, the invention can be also applied to a panel member that compartments an engine room and an interior, for example.

In the meantime, this application is based on Japanese Patent Application (Patent Application No. 2010-220502) filed on Sep. 30, 2010, the disclosures of which are incorporated herein by reference.

INDUSTRIAL APPLICABILITY

As described above, according to the connection structure of conductive paths of the invention, it is possible to simplify the operation sequence by omitting the connection operation accompanying retraction and also to simplify an operation management.

REFERENCE SIGNS LIST

21: hybrid automobile
22: engine
23: motor unit
24: inverter unit
25: battery (device)
26: engine room
27: automobile rear side
28: high voltage wire harness
29: first conductive path
30: panel member
31: through-hole
32: junction block (device)
33: second conductive path
34: first connection part
35: second connection part
36: inner panel
37: first conductive path main body
41: panel member
42: lower side (first surface side) of a floor
43: first conductive path
44: upper side (second surface side) of a floor
45: second conducive path
46: first conductive path main body
47: first connection part
48: through-hole
49: second conductive path main body
50: second connection part
51: inner panel
52: through-hole
53: junction block (device)
54: battery (device)
55: one sidewall
56: high voltage electric cable
57: electromagnetic shield member
58: connection base end portion (main body part)
59: connection leading end portion
60: first terminal
61: first terminal holder
62: first connector housing
63: packing (seal member)
64: shield shell
65: shield member holding ring
66: fixing bolt
67: base end-side first terminal
68: leading end-side first terminal
69: connector fitting part
70: panel member fixing part
71: shield member connection part
72: high voltage electric cable
73: conductor
74: insulator
75: terminal
76: second connector housing
77: second terminal
78: packing
79: terminal accommodation part
80: connector fitting part
81: base for fixing
82: lance
83: second terminal moving mechanism
84: groove
85: electric contact part
86: conductor connection part
87: lance engaging hole
88: substrate part
89: pressing member
90: elastic contact piece
91: side part
92: opening
93: gap
S: terminal following feasibility range

The invention claimed is:

1. A connection structure of conductive paths, comprising:
a first conductive path that is arranged at a first surface side of a panel member, and
a second conductive path that is arranged at a second surface side of the panel member,
wherein a connection leading end portion of a first connection part of the first conductive path is inserted into a through-hole of the panel member and the connection leading end portion and a second connection part of the second conductive path are connected in the vicinity of the through-hole,
a main body part, including a shield shell, of the first connection part is provided with a seal member to cover the through-hole and create a water-tight seal with the shield shell,
the second conductive path including the second connection part is formed as a constitutional member of a device that is provided at the second surface side, and the first conductive path is thus directly connected to the device,
the second conductive path is a bus bar which is connected to the device and connected to the first connection part of the first conductive path,
a second terminal moving mechanism, which includes a feasibility range and an electric cable, configured to move a second terminal of the second connection part in conformity to a position of a first terminal of the connection leading end portion when making the connection, to absorb a positional deviation of the terminals, and
a terminal accommodation part, having a flexible lance, that accommodates the second terminal,
wherein the absorbing includes the second terminal moving in a direction corresponding to the positional deviation of the first terminal, and
the flexible lance latches to the second terminal to restrain a positional deviation of the second terminal.

* * * * *